United States Patent [19]
Gunji et al.

[11] Patent Number: 5,445,684
[45] Date of Patent: Aug. 29, 1995

[54] SLIDE SURFACE CONSTRUCTION HAVING ORIENTATION SPECIFIC B.C.C. METAL LAYER

[75] Inventors: Takahiro Gunji; Yoshikazu Fujisawa; Kazuhisa Okamoto; Masamune Tabata; Kenji Hirose, all of Saitama, Japan

[73] Assignee: Honda Giken Kogyo Kabushiki Kaisha, Tokyo, Japan

[21] Appl. No.: 162,520

[22] Filed: Dec. 3, 1993

[30] Foreign Application Priority Data

| Dec. 3, 1992 | [JP] | Japan | 4-350299 |
| Dec. 7, 1992 | [JP] | Japan | 4-351329 |
| Dec. 7, 1992 | [JP] | Japan | 4-351333 |

[51] Int. Cl.⁶ .................. F16C 17/00; F16C 25/00; F16C 33/00
[52] U.S. Cl. .................. 148/320; 148/319; 428/653
[58] Field of Search .................. 148/320, 319; 428/680

[56] References Cited

U.S. PATENT DOCUMENTS

| 3,666,569 | 5/1972 | Hultgren | 148/320 |
| 4,168,182 | 9/1979 | Rossmann et al. | 148/426 |
| 4,847,166 | 7/1989 | Kaido et al. | 428/653 |
| 4,916,026 | 4/1990 | Bergmann et al. | 428/653 |
| 4,946,747 | 8/1990 | Bergmann et al. | 428/653 |
| 5,310,606 | 5/1994 | Fujisawa et al. | 428/645 |

FOREIGN PATENT DOCUMENTS 2257759  1/1993  United Kingdom .................. 33/12

*Primary Examiner*—Upendra Roy
*Attorney, Agent, or Firm*—Lyon & Lyon

[57] ABSTRACT

A slide surface construction is formed of an aggregate of Fe crystals having a body-centered cubic structure. The aggregate includes {222} oriented Fe crystals with their {222} planes by Miller indices oriented toward a slide surface. The content S of the {222} oriented Fe crystals is in a range represented by S≧20%, preferably in a range represented by S≧40%. The {222} oriented Fe crystals form a trigonal pyramid shape on the slide surface, which provides good oil retention for the slide surface construction. Thus, the slide surface construction exhibits an excellent seizure resistance.

11 Claims, 32 Drawing Sheets

Body-centered cubic structure

5μm

5μm

10μm

10μm

5μm

SLIDE SURFACE CONSTRUCTION HAVING ORIENTATION SPECIFIC B.C.C. METAL LAYER

BACKGROUND OF THE INVENTION

1. Field of the Invention

The present invention relates to a slide surface construction forming a slide surface for a mating member.

2. Description of the Prior Art

An example of such conventionally known slide surface construction is an Fe-plated layer which is formed around the outer peripheral surfaces of a land portion and a skirt portion of a base material of aluminum alloy in a piston for an internal combustion engine in order to provide improved wear resistance.

However, under existing circumstances where high speed and high output of the internal combustion engine are desired, the prior art slide surface constructions suffer from the problems of having an insufficient oil-retaining property, i.e., oil retention, and poor initial conformability and seizure resistance. Further, the prior art slide surface construction also suffer from a difficulty in wear resistance and moreover, from a problem that if the land and skirt portions slide on the inner wall of a cylinder bore under a situation in which there is almost no lubricant, such as while the engine is initially started, the wearing of the inner wall of the cylinder bore may be advanced in some cases by an iron-plated layer having a high hardness.

SUMMARY OF THE INVENTION

It is an object of the present invention to provide a slide surface construction of the type described above, having a sufficient oil retention property and a good initial conformability by specifying the crystal structure thereof, to thereby improve the seizure resistance.

To achieve the above object, according to the present invention, there is provided a slide surface construction, which is formed of an aggregate of metal crystals having a body-centered cubic structure, the aggregate including (hhh) oriented metal crystals with their (hhh) planes by Miller indices oriented toward the slide surface, a content S of said (hhh) oriented metal crystals being in a range represented by $S \geq 20\%$.

In the aggregate of the metal crystals having the body-centered cubic structure, the (hhh) oriented metal crystals with their (hhh) plane by Miller indices oriented toward the slide surface are grown into a columnar form and are of a polygonal pyramid or truncated pyramid shape on the slide surface. Thereupon, if the content S of the (hhh) oriented metal crystals is set in the above-described range, adjacent (hhh) oriented metal crystals are in mutually biting states. As a result, the slide surface takes on an intricate aspect comprising a large number of fine crests, a large number of fine valleys formed between the crests, and a large number of fine swamps formed by the mutual biting of the crests. Therefore, the slide surface construction has an improved oil retention. In addition, the initial conformability of the slide surface constructions is enhanced by the preferential wearing of the tip ends of the (hhh) oriented metal crystals. Thus, the slide surface construction exhibits an excellent seizure resistance.

However, if the content S of the (hhh) oriented metal crystals is less than 20%, the morphology of the slide surface tends to be simplified with a decrease in content of the (hhh) oriented metal crystals, and, hence, the oil retention and initial conformability of the slide surface construction are reduced. The content S of the (hhh) oriented metal crystals is preferably in a range represented by $S \geq 40\%$.

In addition, it is another object of the present invention to provide a slide surface construction of the type described above, having a relatively high hardness, a sufficient oil retention property and a good initial conformability by specifying the crystal structure, thereby improving the wear and seizure resistance of the slide members.

To achieve the above object, according to the present invention, there is provided a slide surface construction, which is formed of an aggregate of metal crystals having a body-centered cubic structure, the aggregate including (hhh) oriented metal crystals with their (hhh) planes by Miller indices oriented toward a slide surface, and (2hhh) oriented metal crystals with their (2hhh) planes by Miller indices oriented toward the slide surface, a content S of the (hhh) oriented metal crystals being in a range represented by $S \geq 20\%$, and the content S of the (2hhh) oriented metal crystals being in a range represented by $20\% \leq S \leq 60\%$.

The (hhh) oriented metal crystals are grown into a columnar form and are of a relatively large pyramid or truncated pyramid shape on the slide surface and have a relatively low hardness.

On the other hand, the (2hhh) oriented metal crystals are of a small pyramid or small cubic shape and take on a very intricate morphology due to the mutual biting thereof. Moreover, the (2hhh) plane of the (2hhh) oriented metal crystals is a secondary slide surface, and, for this reason, the crystal has a relatively high hardness and a high strength.

Thereupon, if the content S of the (hhh) oriented metal crystals and the content S of the (2hhh) oriented metal crystals are set in the above-described range, an oil sump is formed under lubrication in a valley between the (hhh) oriented metal crystals by the (2hhh) oriented metal crystals, leading to an improved oil retention for the slide surface construction. In addition, the preferential wearing of tip ends of the (hhh) oriented metal crystals provides a good initial conformability for the slide surface construction. This makes it possible to provide an improved seizure resistance for the slide surface construction.

After advancement of the wearing of the tip ends of the (hhh) oriented metal crystals, the (hhh) and (2hhh) oriented metal crystals bear the sliding load. The advancement of the wearing is suppressed, however, due to the oil sump and the hardness and strength of the (2hhh) oriented metal crystals. This makes it possible to improve the wear resistance of the slide surface construction.

Even under non-lubrication, an effect of improving the initial conformability by the (hhh) oriented metal crystals is obtained. When flat surfaces, with wearing of the tip ends of the (hhh) oriented metal crystals, are formed thereon, a lubricating capability attributable to the softness of the (hhh) oriented metal crystals is obtained, and, therefore, the (hhh) oriented metal crystals assume the seizure resistance, while the (2hhh) oriented metal crystals assume the wear resistance, thereby providing a good slide characteristic.

If the content S of the (hhh) oriented metal crystals is less than 20% under lubrication or non-lubrication, the initial conformability of the slide surface construction is degraded. On the other hand, if the content S of the (2hhh) oriented metal crystals is more than 60%, the hardness of the slide surface construction is too high and for this reason, the initial conformability is likewise degraded. If the content S of the (2hhh) oriented metal crystals is less than 20%, the wear resistance of the slide surface construction is reduced.

Further, it is an object of the present invention to provide a slide surface construction of the type described above, which has a relatively high strength, a sufficient oil retention and a good initial conformability, leading to improved wear and seizure resistances, and thereby ensuring that the wearing of a mating member is suppressed.

To achieve the above object, according to the present invention, there is provided a slide surface construction, which is formed of an aggregate of metal crystals having a body-centered cubic structure, the aggregate including (hhh) oriented metal crystals with their (hhh) planes by Miller indices oriented toward a slide surface, and (hh0) oriented metal crystals with their (hh0) planes by Miller indices oriented toward the slide surface, the content S of the (hhh) oriented metal crystals and the content S of the (hh0) oriented metal crystals being in a range represented by $S \geq 20\%$, respectively.

The (hhh) oriented metal crystals are grown into a columnar form and are of a relatively large pyramid or truncated pyramid shape on the slide surface but have a relatively low hardness. On the other hand, the (hh0) oriented metal crystals are of a relatively large plate-like shape on the slide surface and have a relatively high hardness and a high strength, because each of the (hh0) planes are a close atom-packed planes.

Thereupon, if the contents S of the (hhh) oriented metal crystals and the content S of the (hh0) oriented metal crystals are set in the above-described ranges, an oil sump having a complicated groove is formed between the (hhh) oriented metal crystals by the mutual biting and overlapping of the (hh0) oriented metal crystals, leading to a good oil retention of the slide surface construction during sliding movement. In addition, the preferential wearing of tip ends of the (hhh) oriented metal crystals provides a good initial conformability for the slide surface construction. This makes it possible to improve the seizure resistance of the slide surface construction.

After advancement of the wearing of the tip ends of the (hhh) oriented metal crystals, the (hhh) and (hh0) oriented metal crystals bear the sliding load, but the advancement of the wearing is suppressed by an effect of the oil sump and the hardness and strength of the (hh0) oriented metal crystals. This makes it possible to improve the wear resistance of the slide surface construction. Even under non-lubrication conditions, the slide surface construction exhibits a wear resistance and also exhibits a sliding characteristic which suppresses the wearing of a mating member.

If the content S of at least one of the (hhh) and (hh0) oriented metal crystals is less than 20%, the wear and seizure resistance of the slide surface construction and the wear suppressing effect of the slide surface construction relative to the mating member are reduced.

The above and other objects, features and advantages of the invention will become apparent from the following description of preferred embodiments, take in conjunction with the accompanying drawings.

DESCRIPTION OF THE PREFERRED EMBODIMENTS

[First embodiment]

Figure 1:
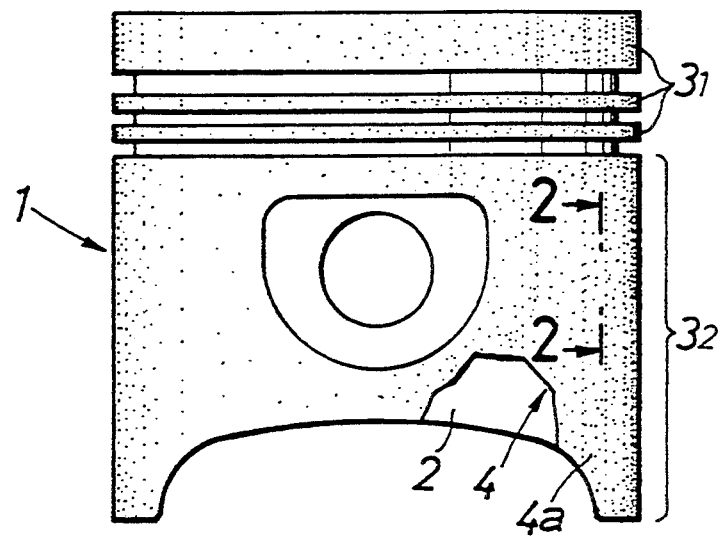
FIG. 1 is a side view of a piston.
Figure 2:
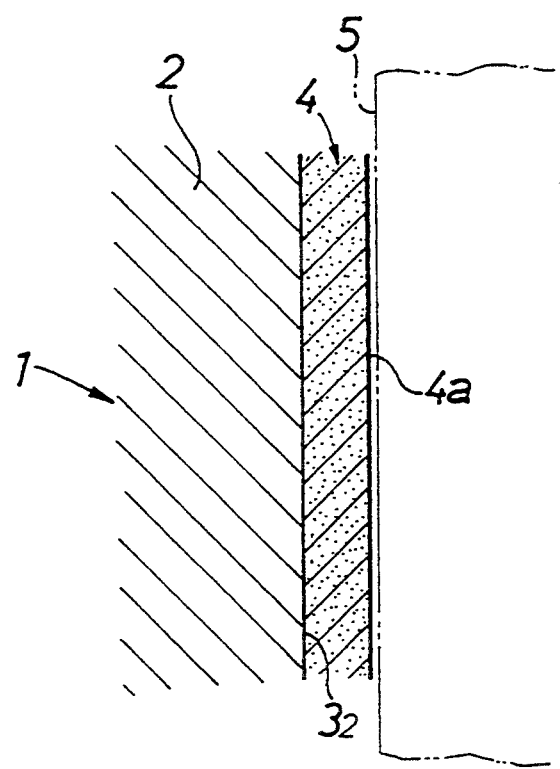
FIG. 2 is a sectional view taken along a line 2—2 in FIG. 1.

Referring to FIGS. 1 and 2, a piston 1 for an internal combustion engine has a base material 2 of aluminum alloy, which includes a land portion $3_1$ and a skirt portion $3_2$ each having a lamellar slide surface construction 4 formed there around by plating.

Figure 3:
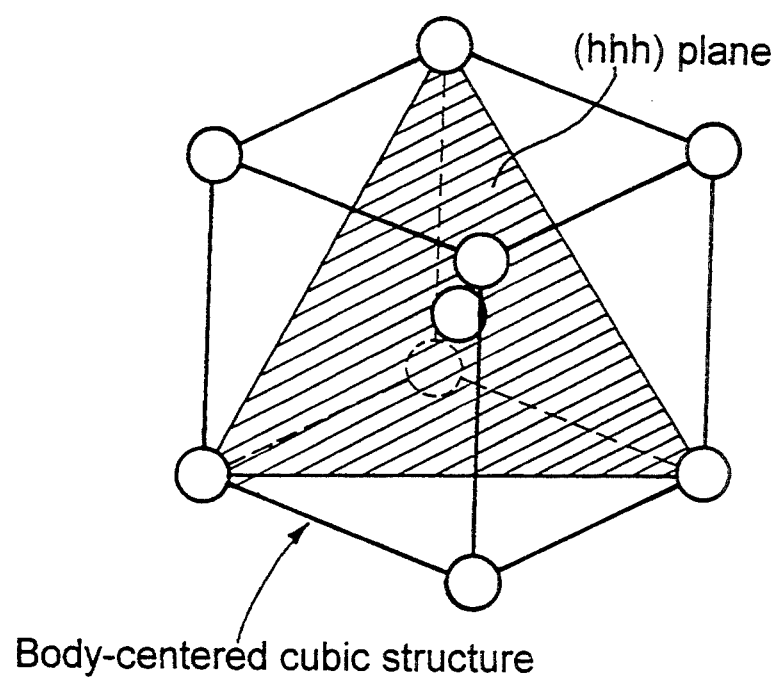
FIG. 3 is a perspective view illustrating a body-centered cubic structure and its (hhh) plane.
Figure 4:
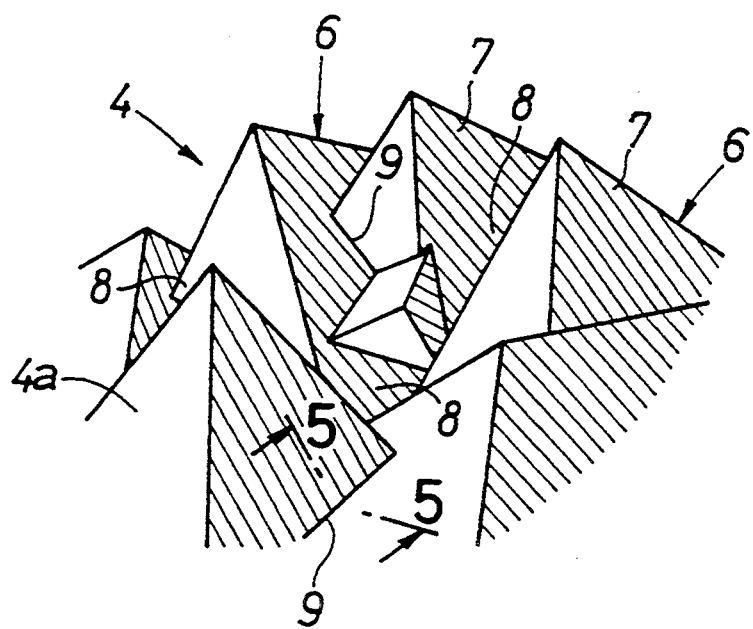
FIG. 4 is a perspective view of an essential portion, illustrating one example of a slide surface construction.
Figure 5:
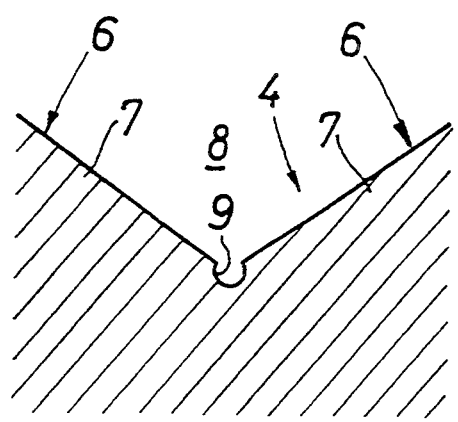
FIG. 5 is a sectional view taken along a line 5—5 in FIG. 4.

As shown in FIGS. 3 and 4, the slide surface construction 4 is formed of an aggregate of metal crystals having a body-centered cubic structure (bcc structure). The aggregate incudes (hhh) oriented metal crystals with their (hhh) planes (by Miller indices) oriented toward a slide surface 4a for an inner wall 5 of a cylinder bore. The content S of the (hhh) oriented metal crystals is set in a range represented by $S \geq 20\%$, preferably $S \geq 40\%$.

The (hhh) oriented metal crystal 6 is grown into a columnar form from the base material 2 and is of a pyramid or truncated pyramid shape, e.g., a trigonal pyramid shape in the illustrated embodiment, on the slide surface 4a. Thereupon, the content S of the (hhh) oriented metal crystal 6 is set in the above range, the adjacent two (hhh) oriented metal crystals 6 are in a mutually biting relation and thus, the slide surface 4a takes on an intricate morphology comprising a large number of fine crest portions 7, a large number of fine valley portions 8 provided between the crest portions, and a large number of fine swamps 9 provided by mutual biting of the crest portions 7. This leads to good oil retention of the slide surface construction 4. The tip end of the trigonal pyramid-shaped (hhh) oriented metal crystal 6 is worn preferentially, thereby improving an initial conformability to the slide surface construction 4.

Figure 6:
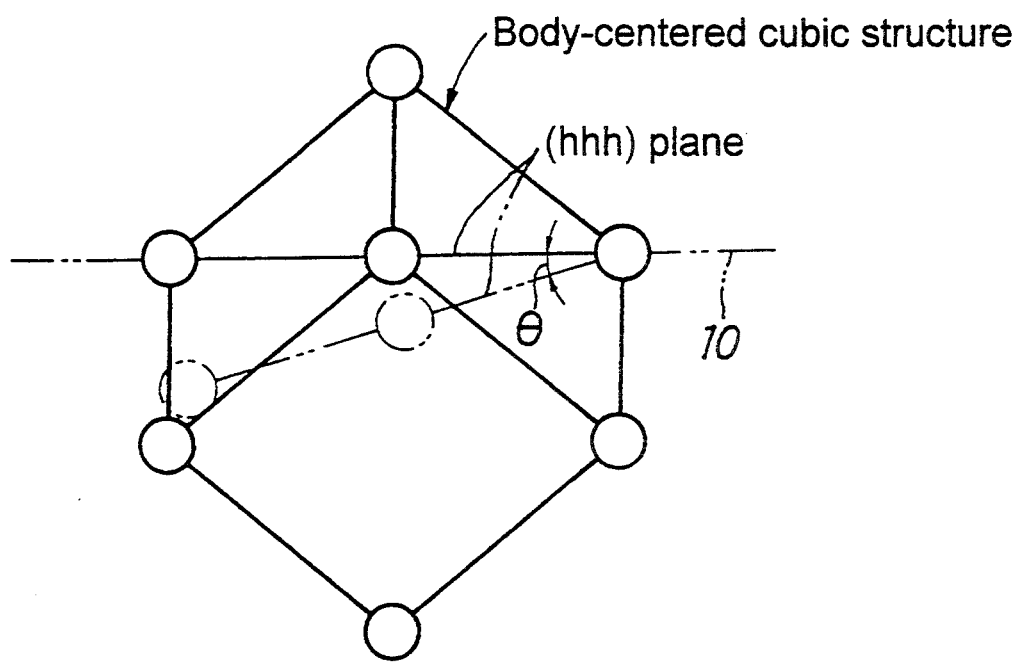
FIG. 6 if a diagram for explaining the inclination of the (hhh) plane in the body-centered cubic structure.

As shown in FIG. 6, an inclination of the (hhh) plane with respect to a phantom plane 10 along the slide surface 4a will cause an inclination of the trigonal pyramid, and hence, will influence the oil retention and the initial conformability of the slide surface construction 4. Thereupon, the inclination angle Θ formed by the (hhh) plane with respect to the phantom plane 10 is set in a range of $0 \leq \Theta \leq 15°$. In this case, the direction of the inclination of the (hhh) plane is not limited. If the inclination angle Θ is more than 15° (Θ>15°), the slide surface construction 4 has a reduced oil retention and a reduced conformability.

The metal crystals having the bcc structure include those of simple metals such as Fe, Cr, Mo, W, Ta, Zr, Nb, V, etc., and the alloys thereof.

In the plating treatment for forming the slide surface construction 4, basic conditions for the electrolytic deposition of the Fe-plating are as given in Tables 1 and 2.

TABLE 1

| Plating bath composition (g/liter) | | | |
|---|---|---|---|
| Ferrous sulfate | Boric acid | Ammonium sulfate | Organic additive(s) |
| 150~300 | 5~50 | 50~200 | 10~150 |

The organic additives used are urea, saccharin, etc.

TABLE 2

| Treating conditions | | |
|---|---|---|
| Plating bath pH | Plating bath temperature (°C.) | Cathode current density (A/dm$^2$) |
| 3~6.5 | 10~60 | 0.1~3 |

In the electrolytic deposition of the Fe-plating under the above-described conditions, the precipitation and content of the (hhh) oriented Fe crystals is controlled by the cathode current density, the PH of a plating bath, the amount of organic additive incorporated and the like.

In addition to electrolytic plating, the plating treatment may also be carried out by a PVD process, a CVD process, a sputtering process, an ion plating and the like, which are gas-phase plating processes. Conditions for W- or Mo-plating by sputtering include, for example, an argon pressure of 2.0 to 1 Pa, an argon acceleration power of DC 1 to 1.5 kW, and temperature of the base material of 150° to 300° C. Conditions for W-plating by a CVD process include, for example, a starting material of WF6, a gas flow rate of 2 to 15 cc/min, a pressure within a chamber of 50 to 300 Pa, and a base material temperature of 40° to 600° C.

Particular examples will be described below.

A plurality of pistons 1 for internal combustion engine were produced by subjecting outer peripheral surfaces of a land portion $3_1$ and a skirt portion $3_2$ of a base material 2 of aluminum alloy to an electrolytic Fe-plating process to form a slide surface construction 4 comprised of an aggregate of Fe crystals.

Tables 3 and 4 show the conditions used for the electrolytic deposition of the Fe-plating in Examples 1 to 8 of the slide surface constructions 4.

TABLE 3

| Example No. | Plating bath composition (g/liter) | | | | |
|---|---|---|---|---|---|
| | Ferrous sulfate | Boric acid | Ammonium sulfate | Urea | Saccharin |
| 1 | 230 | 30 | 100 | 100 | 2 |
| 2 | 230 | 30 | 100 | 100 | 1 |
| 3 | 230 | 30 | 100 | 100 | 1 |
| 4 | 230 | 30 | 100 | 100 | 1.5 |
| 5 | 230 | 30 | 100 | 100 | 1 |
| 6 | 230 | 30 | 100 | 100 | 1 |
| 7 | 230 | 30 | 100 | 100 | 0.4 |
| 8 | 230 | 30 | 100 | 100 | 0.4 |

TABLE 4

| Example No. | Treating conditions | | |
|---|---|---|---|
| | Plating bath pH | Plating bath temperature (°C.) | Cathode current density (A/dm$^2$) |
| 1 | 5.8 | 50 | 0.2 |
| 2 | 6.2 | 50 | 1.3 |
| 3 | 6 | 50 | 1.5 |
| 4 | 6 | 50 | 0.2 |
| 5 | 6 | 50 | 0.2 |
| 6 | 6 | 50 | 1 |
| 7 | 4 | 50 | 5 |

TABLE 4-continued

| Example No. | Treating conditions | | |
|---|---|---|---|
| | Plating bath pH | Plating bath temperature (°C.) | Cathode current density (A/dm$^2$) |
| 8 | 2.7 | 50 | 7 |

Table 5 shows the crystal shape of the slide surface 4a, the gain size of Fe crystals, the content S of oriented Fe crystals, and the hardness for Examples 1 to 8.

TABLE 5

| Example No. | Crystalline shape of slide surface | Grain size (μm) | Content of orientated Fe crystals | | | | | Hardness (Hv) |
|---|---|---|---|---|---|---|---|---|
| | | | {110} | {200} | {211} | {310} | {222} | |
| 1 | HP* | about 5 | 12 | 0 | 18 | 0 | 70 | 250 |
| 2 | HP* | about 8 | 10 | 3 | 17 | 0 | 70 | 305 |
| 3 | HP* | about 10 | 12 | 0 | 15 | 3 | 70 | 310 |
| 4 | HP* | about 6 | 9 | 1.5 | 18 | 1.5 | 70 | 270 |
| 5 | HP* SP* | about 8 about 1 | 16.6 | 1.8 | 29.3 | 1.7 | 50.6 | 278 |
| 6 | TP* SP*, plate-like | about 10 about 1 | 32.8 | 1.2 | 20.8 | 2.2 | 43 | 302 |
| 7 | fine grain PTP* | about .5 about 5 | 15 | 27 | 15 | 13 | 30 | 290 |
| 8 | fine grain PTP* | about .5 about 3 | 16 | 34 | 10 | 19 | 21 | 280 |

Figure 7:
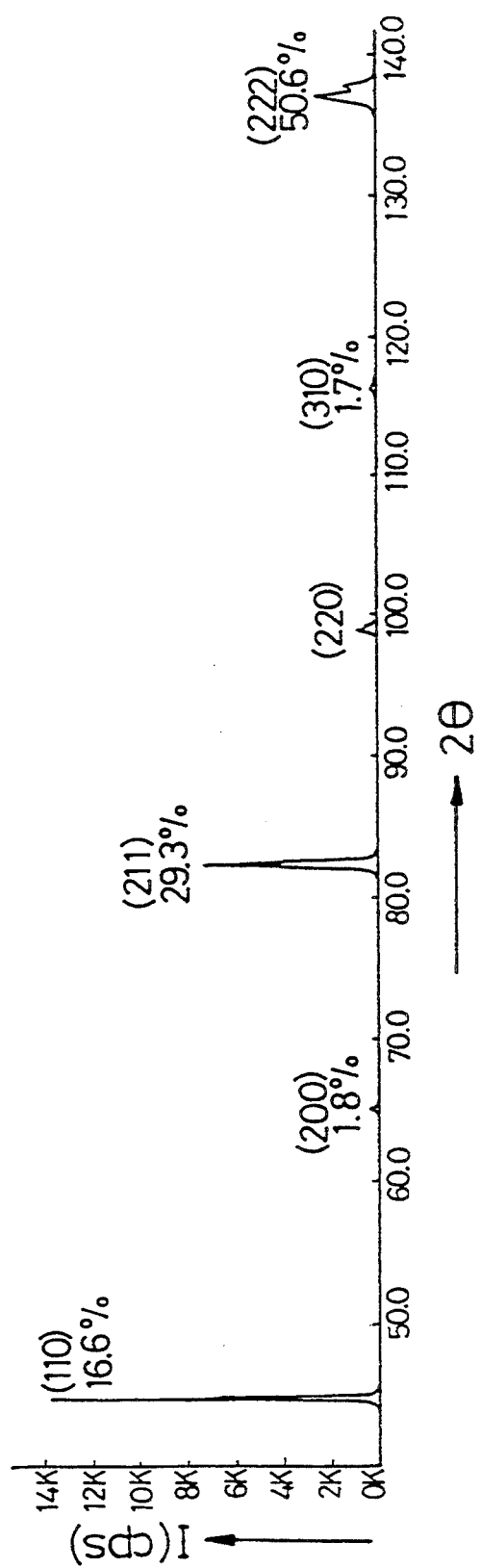
FIG. 7 is an X-ray diffraction pattern for a first example of the slide surface construction.

HP* = hexagonal pyramid
SP* = small pyramid
TP* = trigonal pyramid
PTP* = partially trigonal pyramid The content S of each of the oriented Fe crystals was determined in the following manner on the basis of X-ray diffraction patterns (application of X-ray was in a direction perpendicular to the slide surface 4a) for Examples 1 to 8. As an example, Example 5 will be described below. FIG. 7 is an X-ray diffraction pattern for Example 5. The content S of oriented Fe crystals was determined from the following expressions (the term "{110} oriented Fe crystal" means an oriented Fe crystal with its {110} plane oriented toward the slide surface 4a):

{110} oriented Fe crystals: $S_{110} = \{(I_{110}/IA_{110})/T\} \times 100$

{200} oriented Fe crystals: $S_{200} = \{(I_{200}/IA_{200})/T\} \times 100$

{211} oriented Fe crystals: $S_{211} = \{(I_{211}/IA_{211})/T\} \times 100$

{310} oriented Fe crystals: $S_{310} = \{(I_{310}/IA_{310})/T\} \times 100$

{222} oriented Fe crystals: $S_{222} = \{(I_{222}/IA_{222})/T\} \times 100$ wherein each of $I_{110}$, $I_{200}$, $I_{211}$, $I_{310}$ and $I_{222}$ is a measurement (cps) of intensity of X-ray reflected from each crystal plane; each of $IA_{100}$, $IA_{200}$, $IA_{211}$, $IA_{310}$, $IA_{222}$ is an intensity ratio of X-rays reflected from each crystal plane in an ASTM card. Further, $IA_{110} = 100$, $IA_{200} = 20$, $IA_{211} = 30$, $IA_{310} = 12$, $IA_{222} = 6$, and $T = (I_{110}/IA_{110}) + (I_{200}/IA_{200}) + (I_{211}/IA_{211}) + (I_{310}/IA_{310}) + (I_{222}/IA_{222})$.

Figure 8:
FIG. 8 is a photomicrograph showing the crystal structure of a slide surface in the first example of the slide surface construction.

FIG. 8 is a photomicrograph showing the crystal structure of the slide surface 4a in Example 5. In FIG. 8, a large number of hexagonal pyramid-shaped oriented Fe crystals are observed. These oriented Fe crystals are formed by coalescence of trigonal pyramid-shaped {222} oriented Fe crystals with their (hhh) planes, i.e., {222} planes oriented toward the slide surface 4a. The content S of the hexagonal pyramid-shaped {222} oriented Fe crystals is equal to 50.6%, as shown in Table 5 and FIG. 7.

Figure 9:
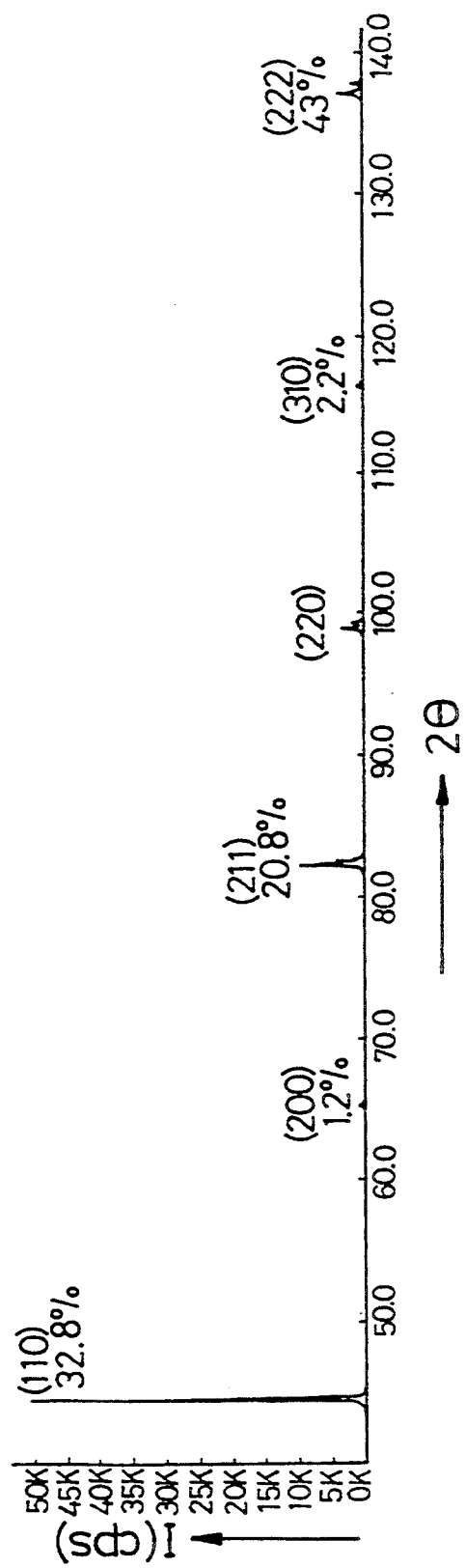
FIG. 9 is an X-ray diffraction pattern for a second example of a slide surface construction.
Figure 10A:
FIG. 10A is a photomicrograph showing the crystal structure of a slide surface in the second example of the slide surface construction.
Figure 10B:
FIG. 10B is a photomicrograph showing the crystal structure of a section in the second example of the slide surface construction.

FIG. 9 is an X-ray diffraction pattern of Example 6. FIG. 10A is a photomicrograph showing the crystal structure of the slide surface 4a in Example 6, and FIG. 10B is a photomicrograph showing the crystal structure of a section in Example 6. In FIGS. 10A and 10B, a large number of trigonal pyramid-shaped {222} oriented Fe crystals are observed. The content S of the trigonal pyramid-shaped {222} oriented Fe crystals is equal to 43%, as shown in Table 5 and FIG. 9.

Figure 11:
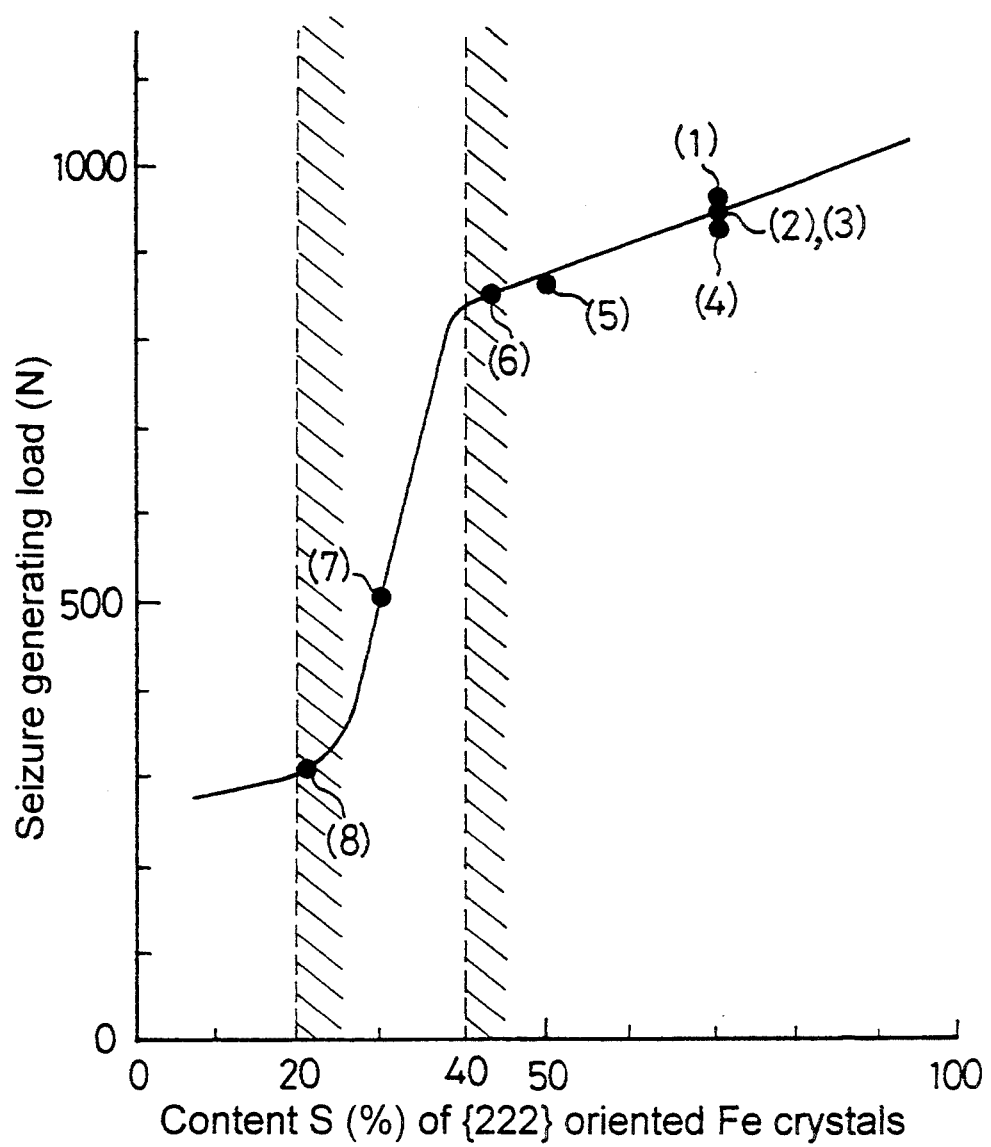
FIG. 11 is a graph illustrating results of a seizure test.

A seizure test was carried out in a chip on disk manner under lubrication for Examples 1 to 8 to determine the relationship between the content S of the {222} oriented Fe crystals and the seizure generating load, thereby providing results shown in Table 6 and in FIG. 11. Conditions for the test were as follows: The material of a disc was an Al–10% by weight of Si alloy; the rotational speed of the disc was of 15 m/sec.; the amount of oil supplied was of 0.3 ml/min.; and the area of the slide surface of the chip made from the slide surface construction was of 1 cm$^2$.

TABLE 6

| Example No. | Seizure generating load (N) |
|---|---|
| 1 | 950 |
| 2 | 940 |
| 3 | 940 |
| 4 | 920 |
| 5 | 860 |
| 6 | 850 |
| 7 | 500 |
| 8 | 300 |

FIG. 11 is a graph taken from Table 6, wherein points (1) to (8) correspond to Example 1 to 8, respectively.

As apparent from Table 6 and FIG. 11, the seizure generating load is steeply increased when the content S of the {222} oriented Fe crystals is in a range represented by S ≧ 20%, and it is increased gently when S ≧ 40%. In each of the Examples 1 to 6, the content S is greater than or equal to 40%, and the slide surface 4a has good oil retention and good initial conformability. Hence, the seizure generating load is increased substantially, as compared with Examples 7 and 8. Particularly, in the case of Examples 1 to 3, the seizure generating load is higher. It is believed that this is because the size and precipitation of the {222} oriented Fe crystals are uniform due to the fact that the content S of at least one of the {200} oriented Fe crystals and {310} oriented Fe crystals is equal to 0%.

[Second embodiment]

Pistons 1 for internal combustion engines were produced by forming a slide surface construction 4 around outer peripheral surfaces of a land portion $3_1$ and a skirt portion $3_2$ of a base material 2 of aluminum alloy by plating in the same manner as in the first embodiment.

Figure 12:
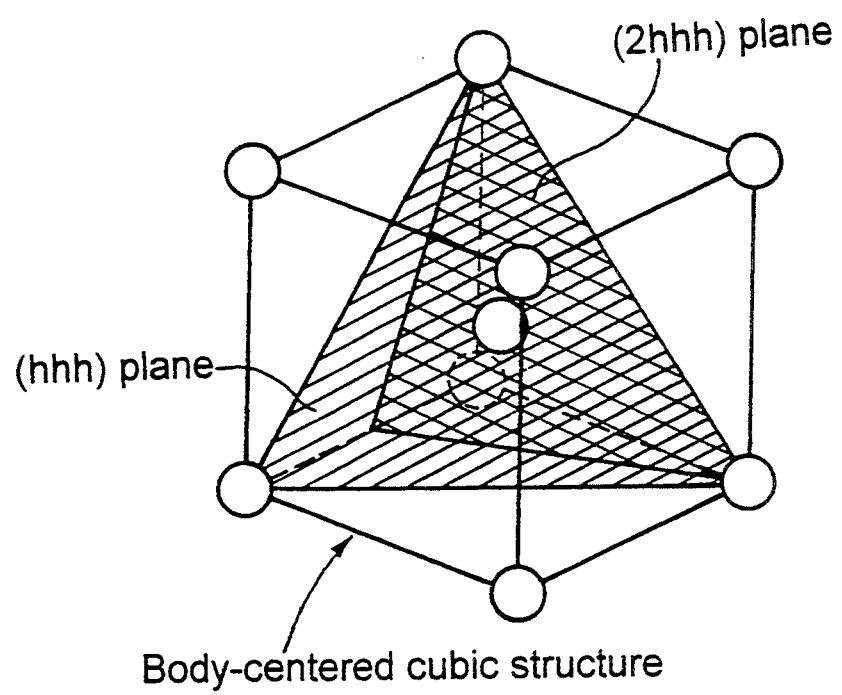
FIG. 12 is a perspective view illustrating a body-centered cubic structure and its (hhh) and (2hhh) planes.
Figure 13:
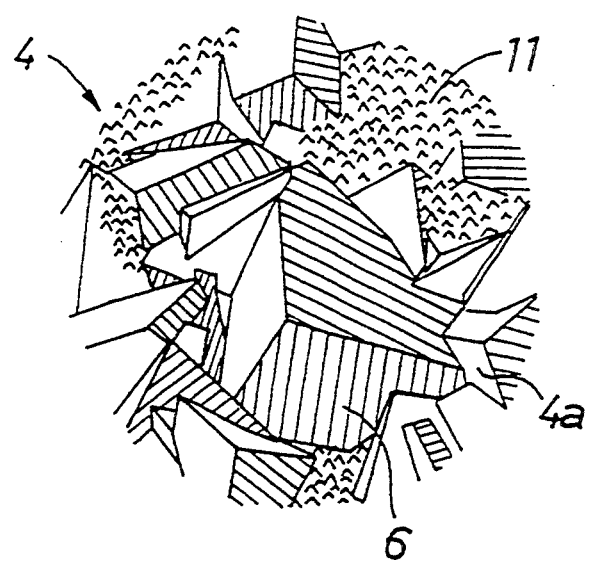
FIG. 13 is a perspective view of an essential portion, illustrating a third example of a slide surface construction.

As shown in FIGS. 12 and 13, the slide surface construction 4 is formed of an aggregate of metal crystals having a body-centered cubic structure (bcc structure). The aggregate includes (hhh) oriented metal crystals with their (hhh) planes (by Miller indices) oriented toward a slide surface 4a for an inner wall 5 of a cylinder bore, and (2hhh) oriented metal crystals with their (2hhh) planes (by Miller indices) oriented toward the slide surface 4a. The content S of the (hhh) oriented metal crystals is set in a range represented by $S \geq 20\%$, and the content S of the (2hhh) oriented metal crystals is set in a range represented by $20\% \leq S \leq 60\%$.

The (hhh) oriented metal crystal 6 is grown into a columnar form and is of a relatively large pyramid or truncated pyramid shape, e.g., a trigonal pyramid shape in the illustrated embodiment, on the slide surface 4a. The hardness of the (hhh) oriented metal crystal 6 is relatively low.

The (2hhh) oriented metal crystal 11 is of a small pyramid shape or a small cubic shape on the slide surface 4a, and the slide surface 4a takes on an intricate morphology comprising these crystals biting into one another. Moreover, the (2hhh) plane of the (2hhh) oriented metal crystal 11 is a secondary slide surface, and for this reason, crystals 11 have a relative high hardness and a high strength.

Thereupon, if the content S of the (hhh) and (2hhh) oriented metal crystals are set in the above manner, an oil sump is formed at a valley between the (hhh) oriented metal crystals by the (2hhh) oriented metal crystals in a lubricated condition, thereby providing good oil retention for the slide surface construction 4. In addition, the preferential wearing of the tip end of the (hhh) oriented metal crystal provides good initial conformability for the slide surface construction 4. This enhances the seizure resistance of the slide surface construction 4.

After the advance of wearing of the tip end of the (hhh) oriented metal crystal, the (hhh) and (2hhh) oriented metal crystals 6 and 11 carry a sliding load, but the advance of wearing is suppressed by an effect of the oil sump and the hardness and strength of the (2hhh) oriented metal crystals 11, so that the wear resistance of the slide surface construction 4 is enhanced. Even in a non-lubricated condition, an effect of enhancing the initial conformability by the (hhh) oriented metal crystal 6 is obtained. When a flat surface is formed as a result of wearing of the tip end of the (hhh) oriented metal crystal 6, a lubricating capability attributable to the softness of the (hhh) oriented metal crystals 6 is provided, so that the (hhh) oriented metal crystals 6 assume the seizure resistance function, while the (2hhh) oriented metal crystals 11 assume the wear resistance function, thereby providing a good sliding characteristic.

As in the first embodiment, the inclination of the (hhh) plane with respect to a phantom plane 10 (see FIG. 6) along the slide surface 4a will cause the inclination of the trigonal pyramid, and hence, will influence the initial conformability of the slide surface construction 4. Thereupon, the inclination angle Θ formed by the (hhh) plane with respect to the phantom plane 10 is set in a range of $0° \leq \Theta \leq 15°$. The inclination angle Θ of the (2hhh) plane is likewise set in a range of $0° \leq \Theta \leq 15°$. In this case, the direction of the inclination of the (hhh) and (2hhh) planes is not limited. If the inclination angle Θ is more than 15° (Θ > 15°), the slide surface construction 4 has a reduced oil retention and a reduced initial conformability.

The metal crystals having the bcc structure include those of simple metals such as Fe, Cr, Mo, W, Ta, Zr, Nb, V, etc., and the alloys thereof.

In the plating treatment for forming the slide surface construction 4 according to the present invention, basic conditions for the electrolytic deposition of the Fe-plating are as given in Tables 7 and 8.

TABLE 7

| Plating bath composition (g/liter) | | | |
|---|---|---|---|
| Ferrous sulfate | Boric acid | Ammonium sulfate | Organic additive(s) |
| 150~300 | 5~50 | 50~200 | 10~150 |

The organic additives used are urea, saccharin, etc.

TABLE 8

| Treating conditions | | |
|---|---|---|
| Plating bath pH | Plating bath temperature (°C.) | Cathode current density (A/dm$^2$) |
| 2.5~6.5 | 10~60 | 0.1~3 |

In the electrolytic deposition of the Fe-plating under the above-described conditions, the precipitation and content of the (hhh) and (2hhh) oriented Fe crystals is controlled by the cathode current density, the pH of the plating bath, the amount of organic additive incorporated and the like.

In addition to the electrolytic plating, the plating treatment may also be carried out by gas-phase plating processes as described in the first embodiment. For example, conditions for W- or Mo- plating by a sputtering process and conditions for W-plating by a CVD process are the same as in the first embodiment.

Particular examples will be described below.

A plurality of pistons 1 for an internal combustion engine were produced by subjecting outer peripheral surfaces of a land portion $3_1$ and a skirt portion $3_2$ of a base material 2 of aluminum alloy to an electrolytic Fe-plating process to form a slide surface construction 4 comprised of an aggregate of Fe crystals.

Tables 9 and 10 show the conditions used for the electrolytic deposition of the Fe-plating in Examples 1 to 16 of the slide surface constructions 4.

TABLE 9

| Example No. | Plating bath composition (g/liter) | | | | |
|---|---|---|---|---|---|
| | Ferrous sulfate | Boric acid | Ammonium sulfate | Urea | Saccharin |
| 1 | 230 | 30 | 100 | 100 | 1 |
| 2 | 230 | 30 | 100 | 100 | 1 |
| 3 | 230 | 30 | 100 | 100 | 0.4 |
| 4 | 300 | 30 | 100 | 20 | 0.4 |
| 5 | 230 | 30 | 100 | 120 | 0 |
| 6 | 230 | 30 | 100 | 120 | 0 |
| 7 | 230 | 30 | 100 | 120 | 0 |
| 8 | 230 | 30 | 100 | 100 | 0 |
| 9 | 230 | 30 | 100 | 100 | 0 |
| 10 | 230 | 30 | 100 | 100 | 0.4 |
| 11 | 230 | 30 | 100 | 100 | 0.4 |
| 12 | 300 | 30 | 100 | 20 | 1 |
| 13 | 230 | 30 | 100 | 100 | 1 |
| 14 | 300 | 30 | 100 | 20 | 1 |

TABLE 9-continued

| Example No. | Plating bath composition (g/liter) | | | | |
|---|---|---|---|---|---|
| | Ferrous sulfate | Boric acid | Ammonium sulfate | Urea | Saccharin |
| 15 | 230 | 30 | 100 | 100 | 1 |
| 16 | 300 | 30 | 100 | 20 | 0.4 |

TABLE 10

| Example No. | Treating conditions | | |
|---|---|---|---|
| | Plating bath pH | Plating bath temperature (°C.) | Cathode current density (A/dm$^2$) |
| 1 | 5.1 | 50 | 1 |
| 2 | 6 | 50 | 1 |
| 3 | 4.2 | 50 | 5 |
| 4 | 3.3 | 50 | 10 |
| 5 | 2.8 | 50 | 1.5 |
| 6 | 2.8 | 50 | 1 |
| 7 | 2.8 | 50 | 0.8 |
| 8 | 2.8 | 50 | 1 |
| 9 | 3 | 50 | 1 |
| 10 | 3 | 50 | 7 |
| 11 | 2.7 | 50 | 7 |
| 12 | 5.7 | 50 | 10 |
| 13 | 2.8 | 50 | 8 |
| 14 | 6 | 50 | 1 |
| 15 | 6 | 50 | 0.8 |
| 16 | 3.3 | 50 | 17 |

Tables 11 and 12 show the crystal shape of the slide surface 4a, the grain size of Fe crystals, the content S of oriented Fe crystals, and the hardness for Examples 1 to 16.

TABLE 11

| Example No. | Crystalline shape of slide surface | Grain size (μm) | Content of orientated Fe crystals | | | | | Hardness (Hv) |
|---|---|---|---|---|---|---|---|---|
| | | | {110} | {200} | {211} | {310} | {222} | |
| 1 | TP*<br>SP*, plate-like | about 8<br>about 1 | 20.7 | 3.3 | 30 | 5.4 | 40.6 | 400 |
| 2 | TP*<br>SP*, plate-like | about 10<br>about 1 | 32.8 | 1.2 | 20.8 | 2.2 | 43 | 302 |
| 3 | TP*<br>fine grain | about 8<br>≦0.5 | 12 | 23 | 15 | 10 | 40 | 280 |
| 4 | TP*<br>SP* | about 8<br>about 1 | 2 | 0 | 75 | 0 | 23 | 580 |
| 5 | TP*<br>SP* | about 3<br>≦0.5 | 10 | 7 | 60 | 3 | 20 | 540 |
| 6 | TP*<br>SP* | about 3<br>≦0.5 | 16 | 6 | 50 | 8 | 20 | 510 |
| 7 | TP*<br>SP* | about 3<br>≦0.5 | 15 | 8 | 50 | 5 | 22 | 510 |
| 8 | TP*<br>SP*, plate-like | about 6<br>about 1 | 20 | 12 | 30 | 18 | 20 | 410 |

SP* = small pyramid
TP* = trigonal pyramid

TABLE 12

| Example No. | Crystalline shape of slide surface | Grain size (μm) | Content of orientated Fe crystals | | | | | Hardness (Hv) |
|---|---|---|---|---|---|---|---|---|
| | | | {110} | {200} | {211} | {310} | {222} | |
| 9 | TP*<br>SP*, plate-like | about 6<br>about 1 | 30 | 10 | 20 | 20 | 20 | 340 |
| 10 | fine grain<br>PTP* | ≦0.5<br>about 3 | 12 | 30 | 15 | 23 | 20 | 200 |
| 11 | fine grain<br>PTP* | ≦0.5<br>about 3 | 16 | 34 | 10 | 19 | 21 | 280 |
| 12 | SP*<br>fine grain | about 1<br>≦0.5 | 10 | 12 | 40 | 23 | 15 | 300 |
| 13 | fine grain<br>SP* | ≦0.5<br>about 1 | 10 | 20 | 20 | 40 | 10 | 230 |
| 14 | plate-like | about 8 | 60 | 7 | 15 | 8 | 10 | 300 |
| 15 | HP*<br>plate-like | about 8<br>about 1 | 22 | 5 | 15 | 8 | 50 | 300 |
| 16 | fine grain | ≦0.5 | 0 | 0 | 100 | 0 | 0 | 600 |

HP* = hexagonal pyramid
SP* = small pyramid
TP* = trigonal pyramid
PTP* = partially trigonal pyramid The content S of each of the oriented Fe crystals was determined in the same manner as in the first embodiment on the basis of X-ray diffraction patterns (application of X-ray was in a direction perpendicular to the slide surface 4a) of Examples 1 to 16.

Figure 14:
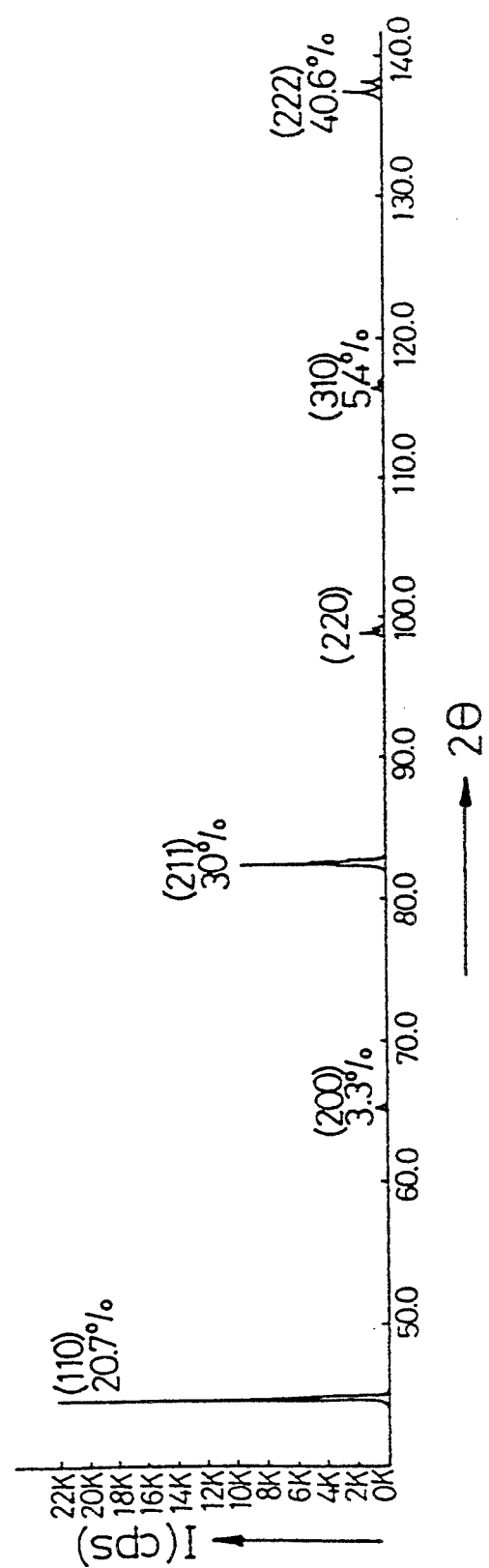
FIG. 14 is an X-ray diffraction pattern for a fourth example of a slide surface construction.
Figure 15A:
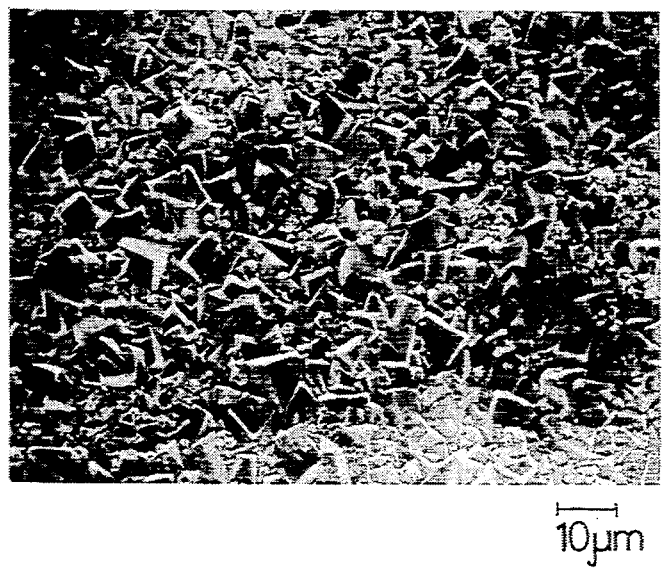
FIG. 15A is a photomicrograph showing the crystal structure of a slide surface in the slide surface construction.
Figure 15B:
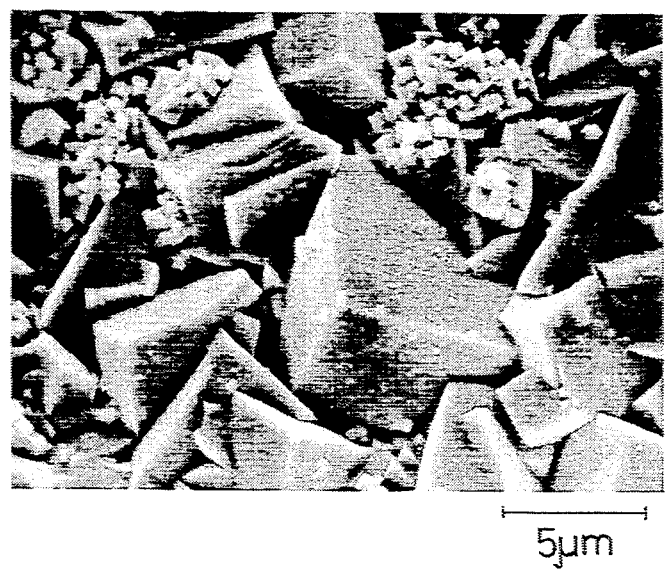
FIG. 15B is an enlarged photomicrograph taken from FIG. 15A.

FIG. 14 is an X-ray diffraction pattern of Example 1. FIGS. 15A and 15B are photomicrographs showing the crystal structure of the slide surface 4a in Example 1, wherein the magnifications in FIGS. 15A and 15B are different from each other. In FIGS. 15A and 15B, a large number of (hhh) oriented Fe crystals of a relatively large trigonal pyramid shape and a large number of (2hhh) oriented Fe crystals of a small pyramid shape are observed. The (hhh) oriented Fe crystal is a {222} oriented Fe crystal with its (hhh) plane, i.e., its {222} plane oriented toward the slide surface 4a. The content S of the {222} oriented Fe crystals is equal to 40.6%, as shown in Table 11 and FIG. 14. The (2hhh) oriented Fe crystal is a {211} oriented Fe crystal with its (2hhh) plane, i.e., its {211} plane oriented toward the slide surface 4a. The content S of the {211} oriented Fe crystals is equal to 30%, as shown in Table 11 and FIG. 14. An oil sump is formed between the {222} oriented Fe crystals, and an oil sump is also formed by the {211} oriented Fe crystals precipitated in a very intricate state in the valleys between the {222} oriented Fe crystals.

A seizure test was carried out in a chip-on-disk manner under lubrication for Examples 1 to 16 to determine the seizure generating load, thereby providing results shown in Table 13. Conditions for the test were the same as in the first embodiment.

TABLE 13

| Example No. | Seizure generating load (N) |
| --- | --- |
| 1 | 800 |
| 2 | 850 |
| 3 | 600 |
| 4 | 300 |
| 5 | 600 |
| 6 | 650 |
| 7 | 650 |
| 8 | 650 |
| 9 | 600 |
| 10 | 300 |
| 11 | 300 |
| 12 | 350 |
| 13 | 300 |
| 14 | 300 |
| 15 | 810 |
| 16 | 400 |

A wear test was carried out for Examples 1, 15 and 16 in a chip-on-disk manner under lubrication to determine the wear amount thereof, thereby providing results shown in Table 14. Conditions for the test are as follows: The material of the disc was Al–10% by weight of Si alloy; the rotational speed of the disc was of 5 m/sec.; the amount of oil supplied was of 0.3 ml/min.; the load was of 100N; the slide distance was of 10 km; the area of the slide surface of the chip made from the slide surface construction was of 1 cm$^2$. The shown wear amount is a decrement (mg) per area (1 cm$^2$) of the chip.

TABLE 14

| Example No. | Wear amount (mg) |
| --- | --- |
| 1 | 1 |
| 15 | 1.5 |
| 16 | 0.7 |

Figure 16:
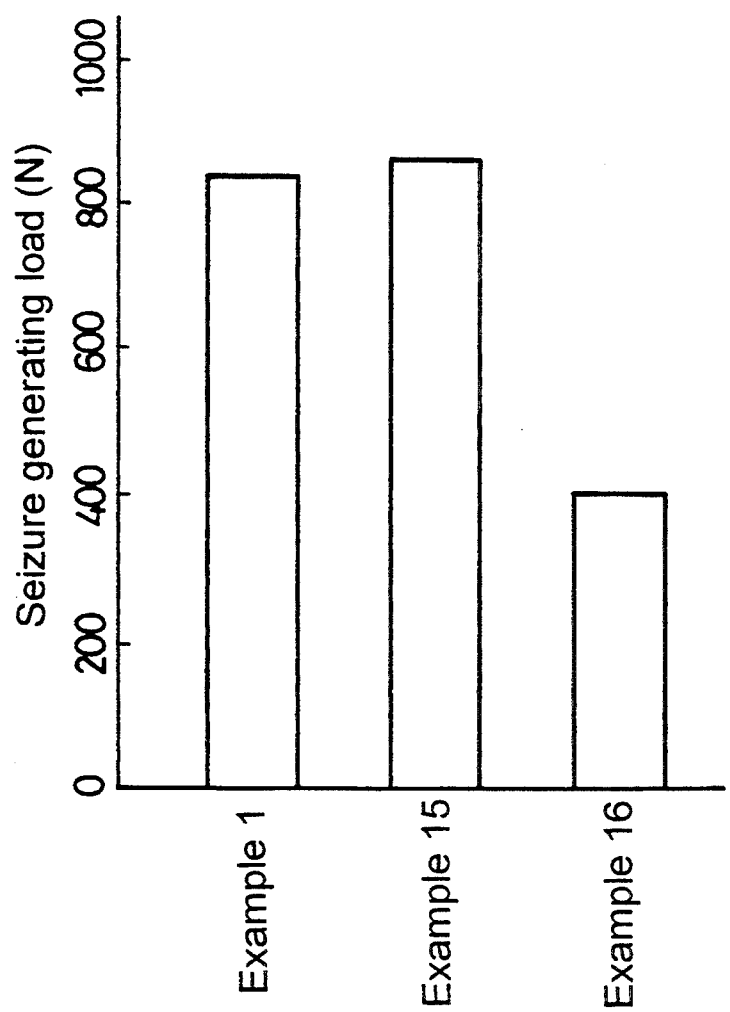
FIG. 16 a graph illustrating the seizure generating load for Examples 1, 15 and 16.
Figure 17:
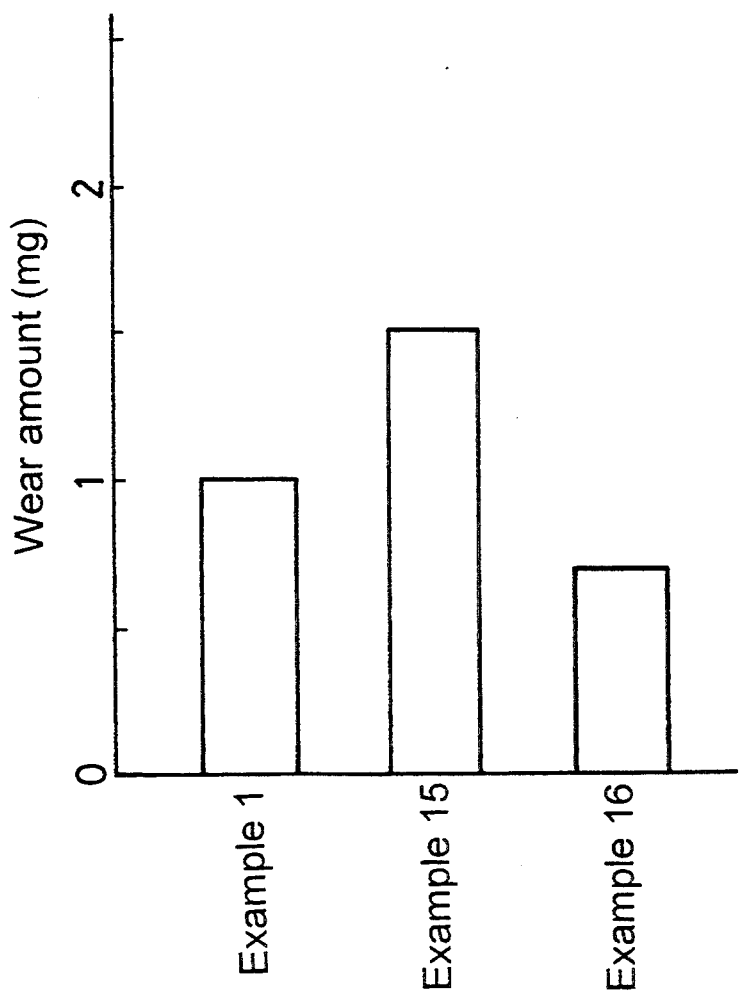
FIG. 17 is a graph illustrating the amount of wear for Examples 1, 15 and 16.

FIG. 16 is a graph taken from Table 13 and illustrating the relationship between the seizure generating load and Examples 1, 15 and 16. FIG. 17 is a graph taken from Table 14 and illustrates the relationship between the amount of wear and Examples 1, 15 and 16. It can be seen from Tables 11 to 13 and FIGS. 16 and 17 that in Example 1, the seizure generating load is high, and the wear amount is small. This is attributable to the fact that the content S of the {222} oriented Fe crystals is in a range represented by $S \geq 20\%$, and the content S of the {211} oriented Fe crystals is in a range of $0\% \leq S \leq 60\%$. In Example 15, because the content S of the {211} oriented Fe crystals is less than 20%, the hardness is low and the seizure resistance is good, but the wear resistance is inferior to Example 1. In Example 16, the wear resistance is excellent, but the seizure resistance is low, because the content S of the {222} oriented Fe crystals is less than 20%, and the content S of the {211} oriented Fe crystals is more than 60%.

Figure 18:
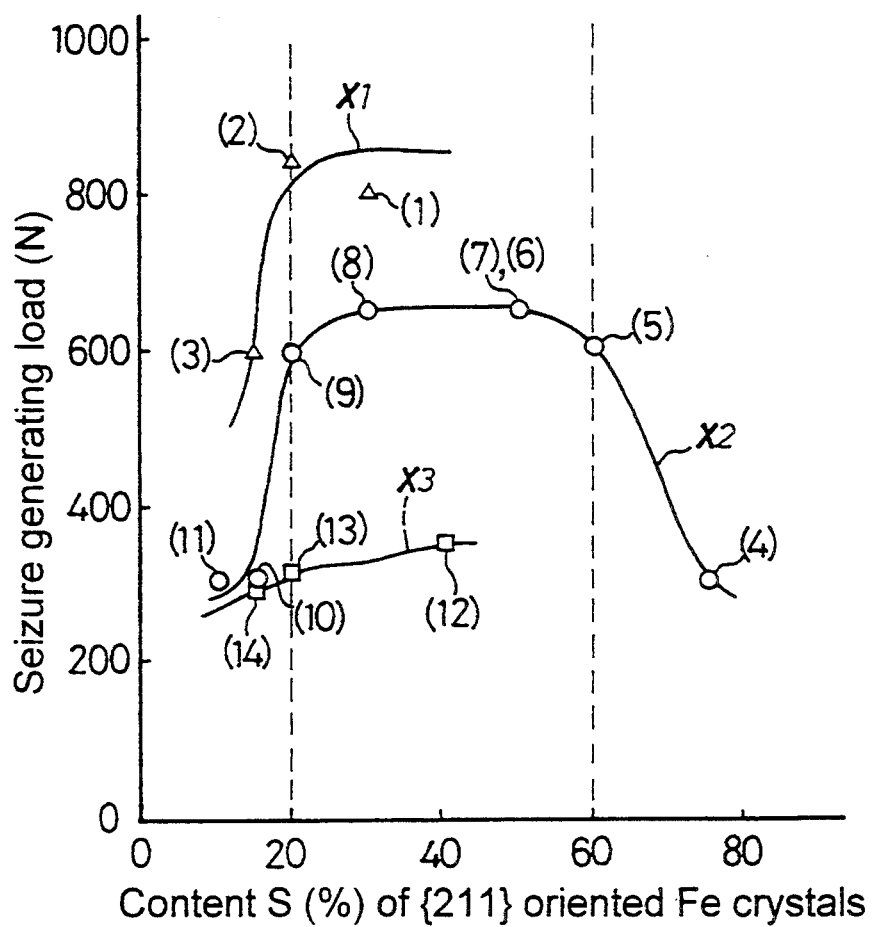
FIG. 18 is a graph illustrating the relationship between the content of {211} oriented Fe crystals and the seizure generating load for Examples 1 to 14.

FIG. 18 illustrates the relationship between the content S of the {211} oriented Fe crystals and the seizure generating load for Examples 1 to 14. In FIG. 18, points (1) to (14) correspond to Examples 1 to 14, respectively. A line $x_1$ indicates such relationship in the case where the content S of the {222} oriented Fe crystals is in a range represented by $40\% \leq S \leq 43\%$; a line $x_2$ indicates such relationship in the case where the content S of the {222} oriented Fe crystals is in a range represented by $20\% \leq S \leq 23\%$; and a line $x_3$ indicates such relationship in the case where the content S of the {222} oriented Fe crystals is in a range represented by $10\% \leq S \leq 15\%$.

It can be seen from Tables 11 and 12 and FIG. 18 that the seizure resistance of the slide surface construction 4 is enhanced by setting the content S of the {222} oriented Fe crystals in a range represented by $S \geq 20\%$ and setting the content S of the {211} oriented Fe crystals in a range represented by $20\% \leq S \leq 60\%$.

Figure 19:
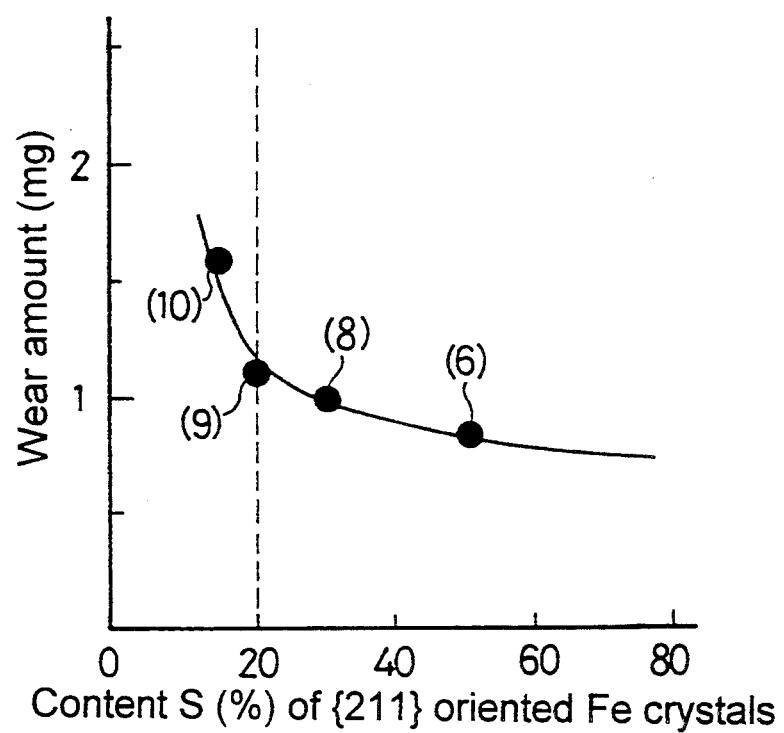
FIG. 19 is a graph illustrating the relationship between the content of (211) oriented Fe crystals and the amount of wear for Examples 6, 8, 9 and 10.

A wear test was carried out for Examples 6, 8, 9 and 10 in a chip-on-disk manner under non-lubrication conditions to determine the content S of the {211} oriented Fe crystals and the wear amount for Examples 6, 8, 9 and 10, thereby providing results shown in Tables 15 and FIG. 19. Conditions for the test were as follows: The material of the disc was an Al–10% by weight of Si alloy; the rotational speed of the disc was of 0.5 m/sec.; the load was of 100N; the slide distance was of 1 km; the area of the slide surface of the chip made from the slide surface construction was of 1 cm$^2$. The wear amount was measured as a decrement (rag) per area (1 cm$^2$) of the chip.

TABLE 15

| Example No. | Content S of {211} oriented Fe crystals (%) | Wear amount (mg) |
| --- | --- | --- |
| 6 | 50 | 0.8 |
| 8 | 30 | 1 |
| 9 | 20 | 1.1 |
| 10 | 15 | 1.6 |

FIG. 19 is a graph taken from Table 15, wherein points (6), (8) to (10) correspond to Examples 6, 8 to 10, respectively. It can be seen from Tables 11, 12 and 15 and FIG. 19 that the seizure resistance of the slide surface construction 4 is enhanced even under non-lubrication by setting the content S of the {211} oriented Fe crystals in a range represented by $S \geq 20\%$ and setting the content S of the {222} oriented Fe crystals in a range represented by $20\% \leq S \leq 60\%$.

[Third embodiment]

In the same manner as in the first embodiment, pistons 1 for an internal combustion engine were produced by forming a lamellar slide surface construction 4 around outer peripheral surfaces of a land portion $3_1$ and a skirt portion $3_2$ of a base material 2 of aluminum alloy by plating.

Figure 20:
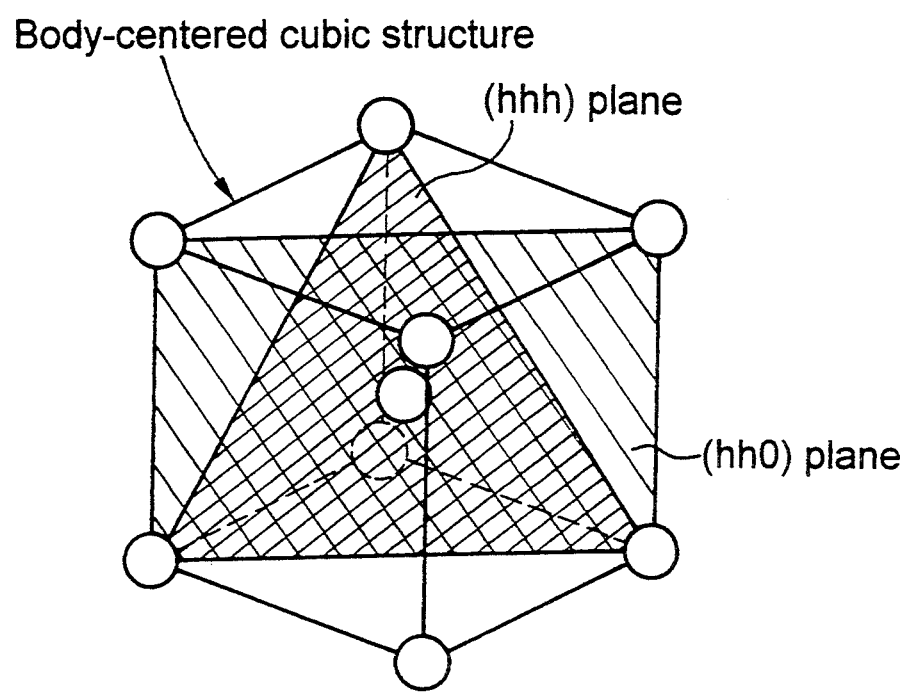
FIG. 20 is a perspective view illustrating a body-centered cubic structure and its (hhh) and hh0) planes.
Figure 21:
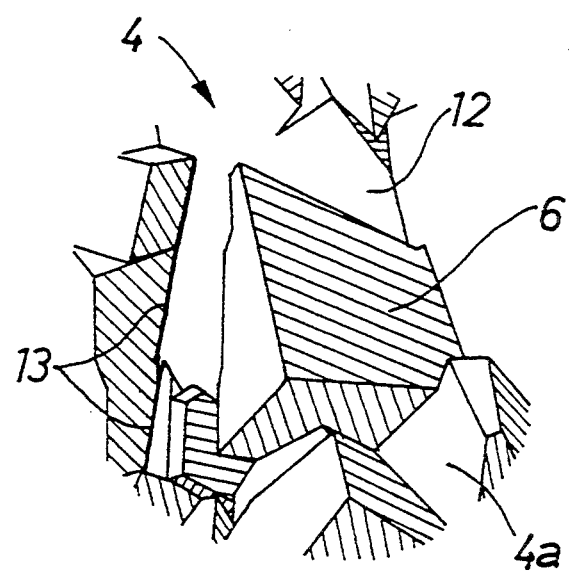
FIG. 21 is a plan view of an essential portion, illustrating a fifth example of a slide surface construction.

As shown in FIGS. 20 and 21, the slide surface construction 4 is formed of an aggregate of metal crystals having a body-centered cubic structure (bcc structure).

The aggregate includes (hhh) oriented metal crystals with their (hhh) planes (by Miller indices) oriented toward a slide surface 4a for an inner wall 5 of a cylinder bore, and (hh0) oriented metal crystals with their (hh0) planes (by Miller indices) oriented toward the slide surface 4a. The content S of the (hhh) oriented metal crystals and the content S of the (hh0) oriented metal crystals is set in a range represented by S≧20%, respectively.

The {222} oriented metal crystals are grown into a columnar form and are of a relatively large pyramid or truncated pyramid shape, e.g., a trigonal pyramid shape in the illustrated embodiment, on the slide surface 4a, as shown in FIG. 21. The hardness of the (hhh) oriented metal crystal 6 is relatively low. On the other hand, the (hh0) oriented metal crystals 12 are of a relatively large plate-like form and have a relatively high hardness and a high strength, because the (hh0) plane is a close atom-packed plane.

If the content S of the (hhh) and (hh0) oriented metal crystals 6 and 12 are set in the above manner, an oil sump having a complicated groove 13 is formed between the (hhh) oriented metal crystals 6 by the mutual biting and overlapping of the (hh0) oriented metal crystals 12, leading to good oil retention for the slide surface construction 4 during sliding movement. In addition, the preferential wearing of the tip end of the (hhh) oriented metal crystals 6 provides good initial conformability of the slide surface construction 4. This provides an improved seizure resistance for the slide surface construction 4.

After advancement to the wearing of the tip end of the (hhh) oriented metal crystals 6, the (hhh) and (hh0) oriented metal crystals 6 and 12 assume the sliding load, but the advancement of the wearing is suppressed by an effect of the oil sump and the hardness and strength of the (hh0) oriented metal crystals 12, leading to an enhanced wear resistance for the slide surface construction 4. In addition, even under non-lubrication conditions, the slide surface construction 4 exhibits a wear resistance and a slide characteristic which suppresses the wearing of the inner wall 5 of the cylinder bore, which is the mating member.

As in the first embodiment, the inclination of the (hhh) plane with respect to a phantom plane 10 (see FIG. 6) along the slide surface 4a will cause an inclination of the trigonal pyramid, and hence, will influence the initial conformability of the slide surface construction 4. Thereupon, the inclination angle Θ formed by the (hhh) plane with respect to the phantom plane 10 is set in a range represented by 0°≦Θ≦15°. The inclination angle Θ of the (hh0) plane also influences the oil retention of slide surface construction 4, and hence, the inclination angle Θ of the (hh0) plane is also set in a range represented by 0°≦Θ≦15°. In this case, the direction of the inclination of the (hhh) and (hh0) planes is not limited. If the inclination angles of the (hhh) and (hh0) plane exceed 15°, the slide surface construction 4 has a reduced oil retention and a reduced initial conformability.

The metal crystals having the bcc structure include those of simple metal such as Fe, Cr, Mo, W, Ta, Zr, Nb, V and the like, and the alloys thereof.

In the plating treatment for forming the slide surface construction 4 according to the present invention, basic conditions for electrolytic deposition of the Fe-plating are as given in Tables 16 and 17.

TABLE 16

| Plating bath composition (g/liter) | | | |
|---|---|---|---|
| Ferrous sulfate | Boric acid | Ammonium sulfate | Organic additive(s) |
| 150~400 | 5~50 | 50~200 | 10~150 |

The organic additives used are urea, saccharin, etc.

TABLE 17

| Treating conditions | | |
|---|---|---|
| Plating bath pH | Plating bath temperature (°C.) | Cathode current density |
| 2.5~7 | 10~60 | 0.1~3 |

In the electrolytic deposition of the Fe-plating under the above-described conditions, the precipitation and content of the (hhh) and (hh0) oriented Fe crystals is controlled by the cathode current density, the pH of the plating bath, the amount of the organic additive incorporated and the like.

In addition to the electrolytic plating process, any of the gas-phase plating processes similar to those in the first embodiment may be used. For example, conditions for W- or Mo- plating by a sputtering process and conditions for W-plating by a CVD process are similar to those in the first embodiment.

Particular examples will be described below.

A plurality of pistons 1 for internal combustion engines were produced by subjecting outer peripheral surfaces of a land portion $3_1$ and a skirt portion $3_2$ of a base material 2 of aluminum alloy to an electrolytic Fe-plating process to form a slide surface construction 4 comprised of an aggregate of Fe crystals.

Tables 18 and 19 show the conditions used for the electrolytic deposition of the Fe-plating in Examples 1 to 14 of the slide surface constructions 4.

TABLE 18

| Example No. | Plating bath composition (g/liter) | | | | |
|---|---|---|---|---|---|
| | Ferrous sulfate | Boric acid | Ammonium sulfate | Urea | Saccharin |
| 1 | 230 | 30 | 100 | 100 | 1 |
| 2 | 230 | 30 | 100 | 100 | 1 |
| 3 | 230 | 30 | 100 | 100 | 1 |
| 4 | 230 | 30 | 100 | 100 | 0.4 |
| 5 | 230 | 30 | 100 | 100 | 1 |
| 6 | 230 | 30 | 100 | 100 | 1 |
| 7 | 230 | 30 | 100 | 100 | 1 |
| 8 | 230 | 30 | 100 | 100 | 0.4 |
| 9 | 230 | 30 | 100 | 100 | 0.4 |
| 10 | 300 | 30 | 100 | 20 | 0.4 |
| 11 | 300 | 30 | 100 | 20 | 1 |
| 12 | 300 | 30 | 100 | 20 | 1 |
| 13 | 230 | 30 | 100 | 100 | 1 |
| 14 | 230 | 30 | 100 | 100 | 1 |

TABLE 19

| Example No. | Treating conditions | | |
|---|---|---|---|
| | Plating bath pH | Plating bath temperature (°C.) | Cathode current density (A/dm$^2$) |
| 1 | 6 | 50 | 1 |
| 2 | 5.8 | 50 | 1 |
| 3 | 5.1 | 50 | 1 |
| 4 | 4.2 | 50 | 5 |
| 5 | 3.5 | 50 | 1 |
| 6 | 3 | 50 | 0.8 |
| 7 | 2.8 | 50 | 1 |
| 8 | 3.2 | 50 | 7 |
| 9 | 3 | 50 | 7 |
| 10 | 3.3 | 50 | 10 |

TABLE 19-continued

| | Treating conditions | | |
|---|---|---|---|
| Example No. | Plating bath pH | Plating bath temperature (°C.) | Cathode current density (A/dm$^2$) |
| 11 | 6 | 50 | 1 |
| 12 | 6.2 | 50 | 6 |
| 13 | 2.8 | 50 | 6 |
| 14 | 2.8 | 50 | 8 |

Tables 20 and 21 show the crystal shape of the slide surface 4a, the grain size of Fe crystals, the content S of oriented Fe crystals, and the hardness for Examples 1 to 14.

TABLE 20

| Example No. | Crystalline shape of slide surface | Grain size (μm) | Content of orientated Fe crystals | | | | | Hardness (Hv) |
|---|---|---|---|---|---|---|---|---|
| | | | {110} | {200} | {211} | {310} | {222} | |
| 1 | TP* plate-like, SP* | about 10 about 1 | 32.8 | 1.2 | 20.8 | 2.2 | 43 | 302 |
| 2 | TP* plate-like, SP* | about 8 about 1 | 30 | 6 | 15 | 9 | 40 | 270 |
| 3 | TP* plate-like | about 8 about 1 | 20.7 | 3.3 | 30 | 5.4 | 40.6 | 400 |
| 4 | TP* fine grain | about 8 about 1 | 12 | 23 | 15 | 10 | 40 | 280 |
| 5 | TP* plate-like | about 6 about 1 | 50 | 5 | 10 | 15 | 20 | 350 |
| 6 | TP* plate-like, SP* | about 6 about 1 | 30 | 12 | 20 | 13 | 25 | 350 |
| 7 | TP* plate-like, SP* | about 6 about 1 | 20 | 12 | 30 | 18 | 20 | 410 |

SP* = small pyramid
TP* = trigonal pyramid

TABLE 21

| Example No. | Crystalline shape of slide surface | Grain size (μm) | Content of orientated Fe crystals | | | | | Hardness (Hv) |
|---|---|---|---|---|---|---|---|---|
| | | | {110} | {200} | {211} | {310} | {222} | |
| 8 | PTP* fine grain | about 3 ≦0.5 | 15 | 30 | 15 | 20 | 20 | 190 |
| 9 | PTP* fine grain | about 3 ≦0.5 | 12 | 30 | 15 | 23 | 20 | 200 |
| 10 | SP* TP* | about 1 about 8 | 2 | 0 | 75 | 0 | 23 | 580 |
| 11 | plate-like | about 8 | 60 | 7 | 15 | 8 | 10 | 300 |
| 12 | plate-like fine grain | about 8 ≦0.5 | 30 | 20 | 15 | 25 | 10 | 270 |
| 13 | fine grain SP*, plate-like | ≦0.5 about 1 | 20 | 20 | 20 | 30 | 10 | 350 |
| 14 | fine grain SP* | ≦0.5 about 1 | 10 | 20 | 20 | 40 | 10 | 230 |

SP* = small pyramid
TP* = trigonal pyramid
PTP* = partially trigonal pyramid

The content S was determined in the same manner as in the first embodiment on the basis of X-ray diffraction patterns (application of X-ray was in a direction perpendicular to the slide surface 4a) for Examples 1 to 14.

Figure 22:
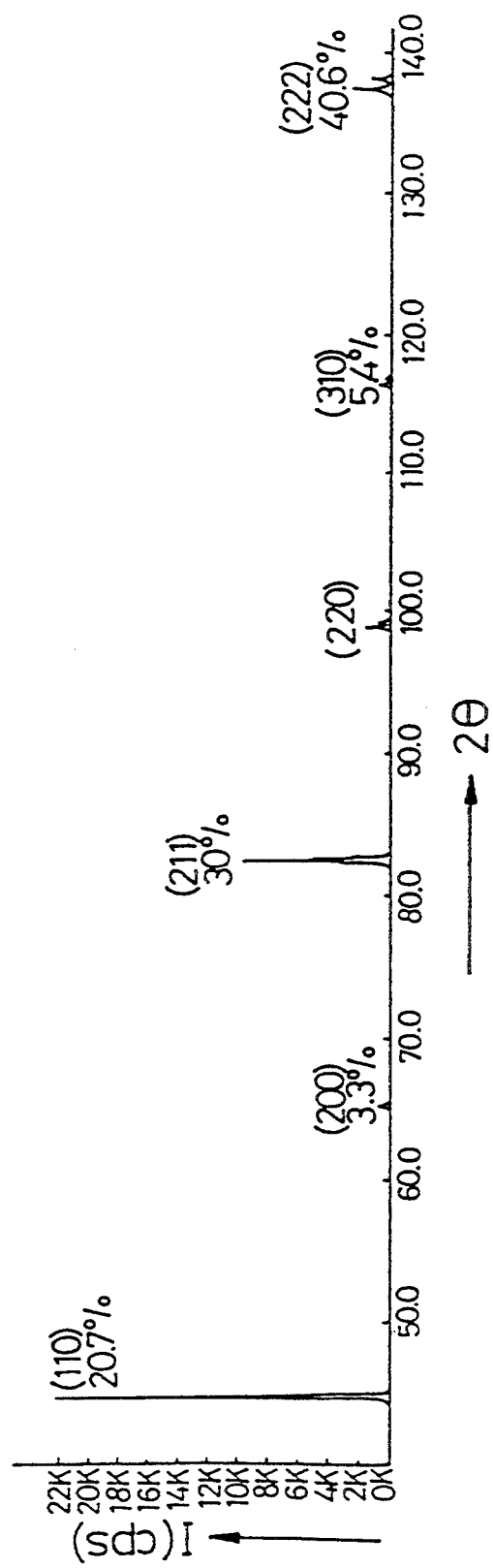
FIG. 22 is an X-ray diffraction pattern for a sixth example of a slide surface construction.
Figure 23:
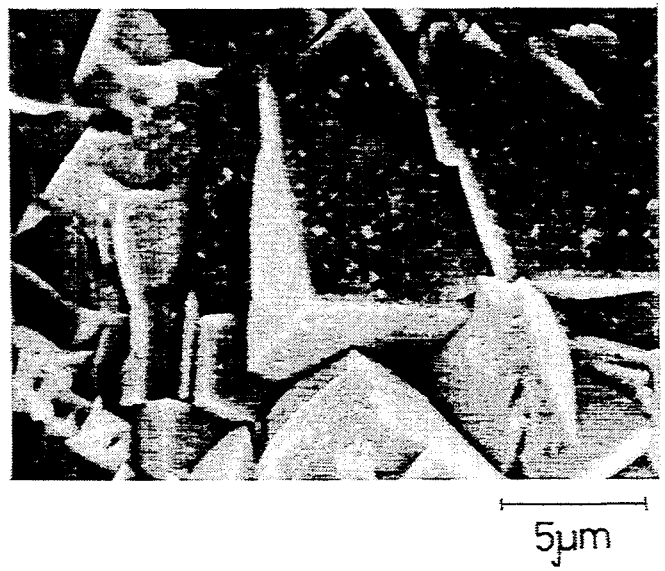
FIG. 23 is a photomicrograph showing the crystal structure of a slide surface in the sixth example of the slide surface construction.

FIG. 22 is an X-ray diffraction pattern for Example 3, and FIG. 23 is a photomicrograph showing the crystal structure of the slide surface 4a in Example 3. In FIGS. 23, (hhh) oriented Fe crystals of a relatively large trigonal pyramid shape and a large number of (hh0) oriented Fe crystals of a plate-like shape are observed. The (hhh) oriented Fe crystal is a {222} oriented Fe crystal with its (hhh) plane, and thus its {222} plane, oriented toward the slide surface 4a, and the content S of the (hhh) oriented Fe crystals is equal to 40.6%, as shown in Table 20 and FIG. 22. The (hh0) oriented Fe crystal is a {110} oriented Fe crystal with its (hh0) plane, and thus its {110} plane, oriented toward the slide surface 4a, and the content S of the {110} oriented Fe crystals is equal to 20.7%, as shown in Table 20 and FIG. 22. An oil sump is formed between the {222} oriented Fe crystals by the mutual biting of the {110} oriented Fe crystals.

A seizure test was carried out in a chip-on-disk manner under lubrication for Examples 1 to 14 to determine the seizure generating load, thereby providing results given in Table 22. Conditions for the test are the same as in the first embodiment.

Figure 24:
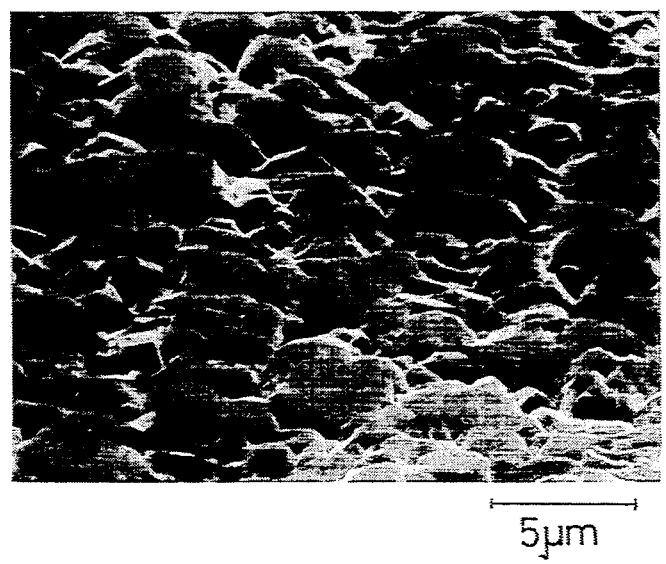
FIG. 24 is a photomicrograph showing the crystal structure of a slide surface in the sixth example of the slide surface construction after sliding movement.

FIG. 24 is a photomicrograph showing the crystal structure of the slide surface in Example 3 after sliding movement, and it can be seen from FIG. 24 that the tip ends of the {222} oriented Fe crystals have been worn.

TABLE 22

| Example No. | Seizure generating load (N) |
|---|---|
| 1 | 850 |

TABLE 22-continued

| Example No. | Seizure generating load (N) |
| --- | --- |
| 2 | 810 |
| 3 | 800 |
| 4 | 600 |
| 5 | 700 |
| 6 | 650 |
| 7 | 650 |
| 8 | 325 |
| 9 | 300 |
| 10 | 300 |
| 11 | 300 |
| 12 | 350 |
| 13 | 300 |
| 14 | 300 |

Figure 25:
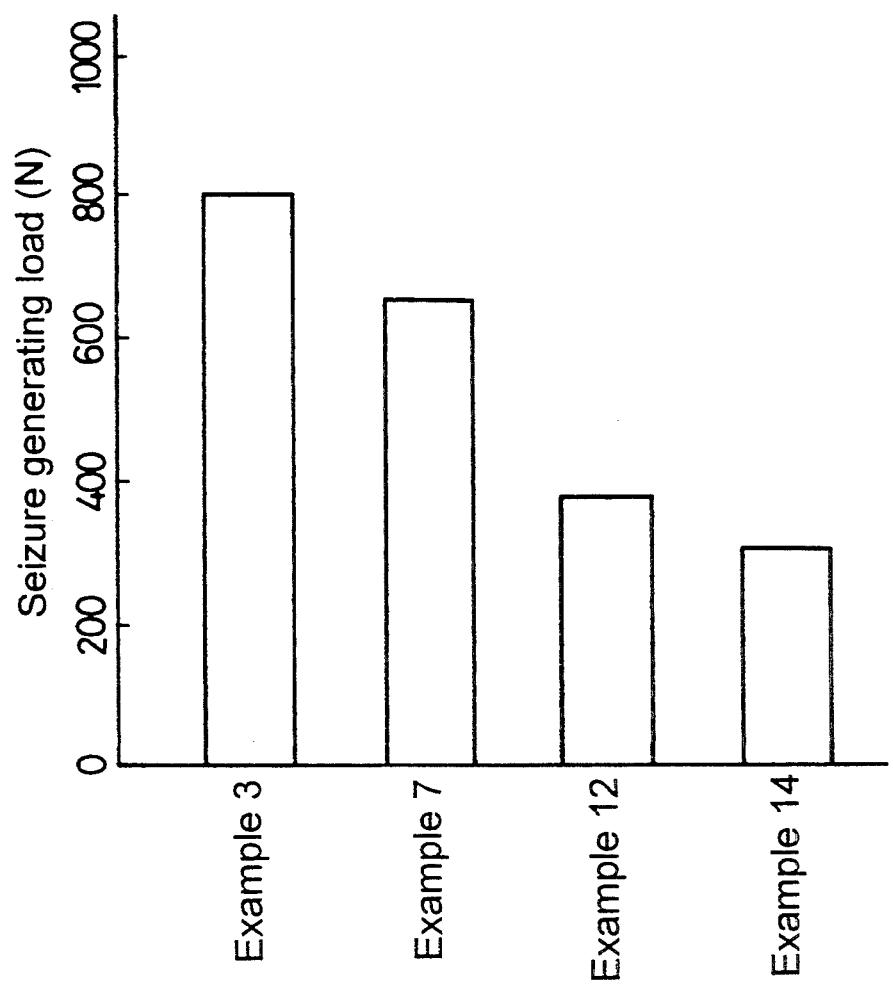
FIG. 25 is a graph illustrating the seizure generating load for Examples 3, 7, 12 and 14.

FIG. 25 is a graph taken from Table 22 to illustrate the relationship between the seizure generating load and the Examples 3, 7, 12 and 14. It can be seen from Table 22 and FIG. 25 that the seizure generating load in Examples 3 and 7 is high. This is attributable to the fact that the content S of the {222} oriented Fe crystals and the content S of the {110} oriented Fe crystals are in a range represented by $S \geq 20\%$, respectively.

Figure 26:
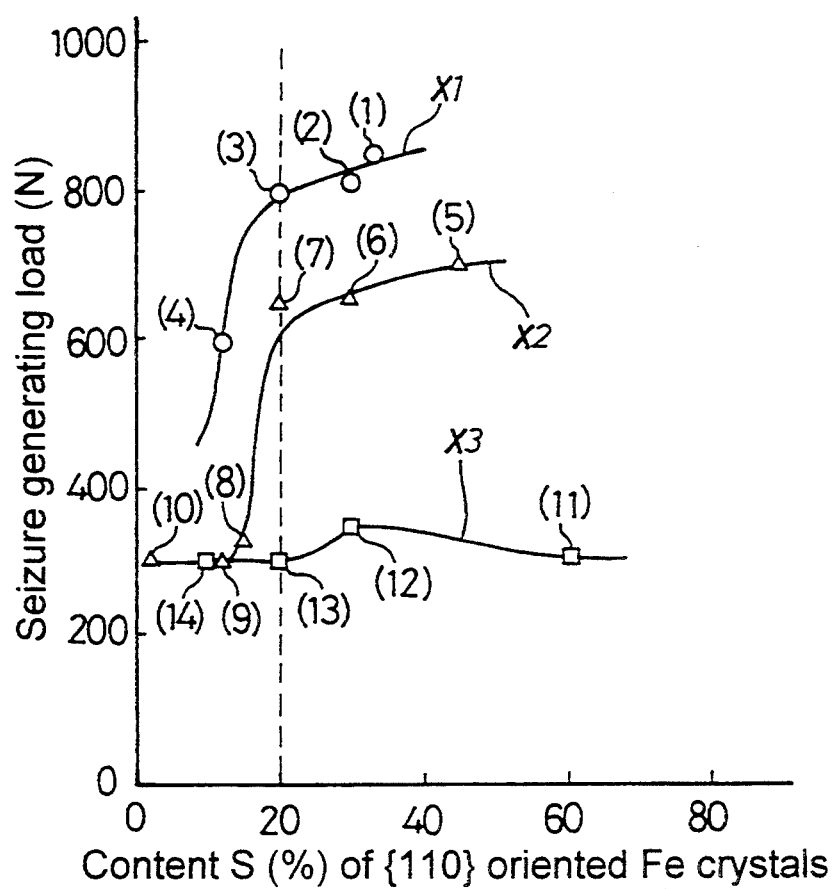
FIG. 26 is a graph illustrating the relationship between the content of {110} oriented Fe crystals and the seizure generating load for Examples 1 to 14.

FIG. 26 illustrates the relationship between the content S of the {110} oriented Fe crystals and the seizure generating load for Examples 1 to 14. In FIGS. 26, points (1) to (14) correspond to Examples 1 to 14, respectively. Line $x_1$ indicates the relationship in the case where the content S of the {222} oriented Fe crystals is in a range represented by $S \geq 40\%$, line $x_2$ indicates the relationship in the case where the content S of the {222} oriented Fe crystals is in a range represented by $20\% \leq S \leq 25\%$; and line $x_3$ indicates the relationship in the case where the content S of the {222} oriented Fe crystals is equal to 10%.

It can be seen from FIG. 26 that the seizure resistance of the slide surface construction is enhanced by setting the content S of the {222} oriented Fe crystals and the content S of the {110} oriented Fe crystals in a range represented by $S \geq 20\%$, respectively.

Figure 27:
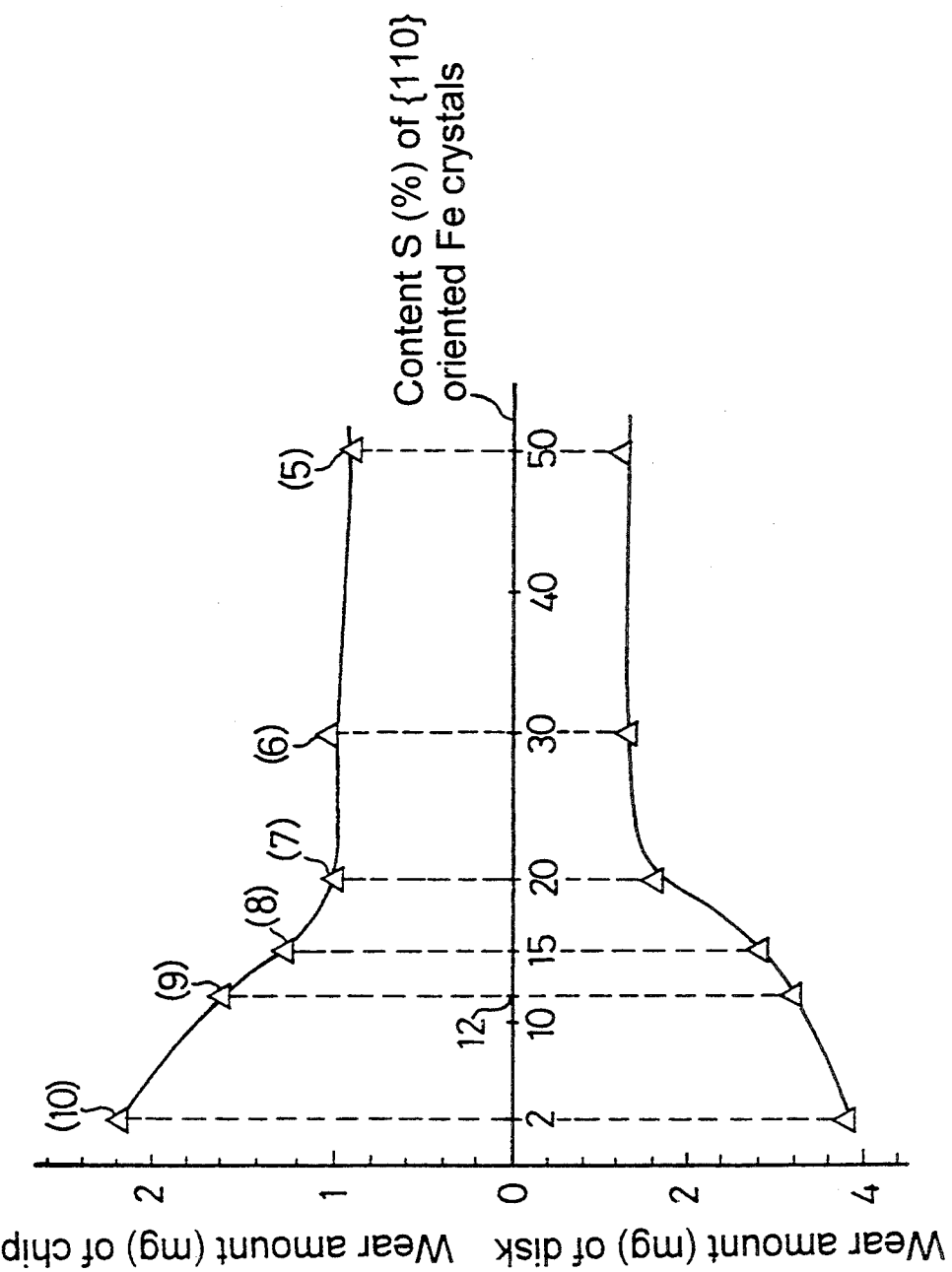
FIG. 27 is a graph illustrating the relationship between the content of {110} oriented Fe crystals and the amounts of wear of a chip and a disk in Examples 5 to 10.

A wear test was carried out for Examples 5 to 10 in a chip-on-disk manner under non-lubrication conditions to find a relationship between the content S of the {110} oriented Fe crystals and the wear amounts of the chip and disk, thereby providing results shown in Table 23 and FIG. 27. Conditions for the test were the same as in the second embodiment. It should be noted that each of the wear amounts is a decrement (mg) per area (1 cm$^2$) of the disk and chip.

TABLE 23

| | | Wear amount (mg) |
| --- | --- | --- |
| Example 5) | chip | 0.9 |
| | disk | 1.2 |
| Example 6) | chip | 1 |
| | disk | 1.4 |
| Example 7) | chip | 1 |
| | disk | 1.6 |
| Example 8) | chip | 1.3 |
| | disk | 2.8 |
| Example 9) | chip | 1.6 |
| | disk | 3.2 |
| Example 10) | chip | 2.2 |
| | disk | 3.8 |

FIG. 27 is a graph taken from Table 23, wherein points (5) to (10) correspond to the chips in Examples 5 to 10, respectively.

As apparent from Table 23 and FIG. 27, the chips in Examples 5 to 7 with the content S of the {222} and {110} oriented Fe crystals being in a range represented by $S \geq 20\%$, respectively, were worn less, as compared with Examples 8 to 10, and the wearing of the disks as mating members could be suppressed substantially in Examples 5 to 7.

The wear test was carried out under non, lubrication conditions, but even in a wear test under lubrication conditions, a tendency similar to that in the test under non-lubrication was observed. It should be noted that conditions for the wear test under lubrication were the same as in the second embodiment.

In the metal crystals having the body-centered cubic structure, the crystal shape on the slide surface, crystal planes located on the slants (which include opposite triangular end faces in FIG. 31) for the oriented metal crystals, and the like are shown in Table 24.

TABLE 24

Figure 28:
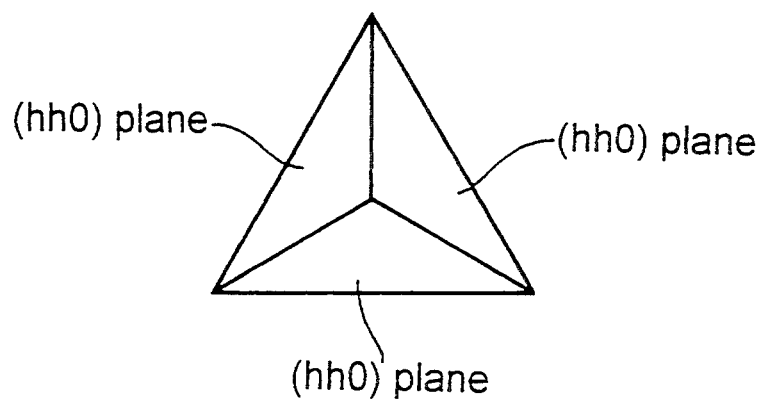
FIG. 28 is a plan view illustrating crystal planes located on slants at a trigonal pyramid-shaped tip end portion.
Figure 29:
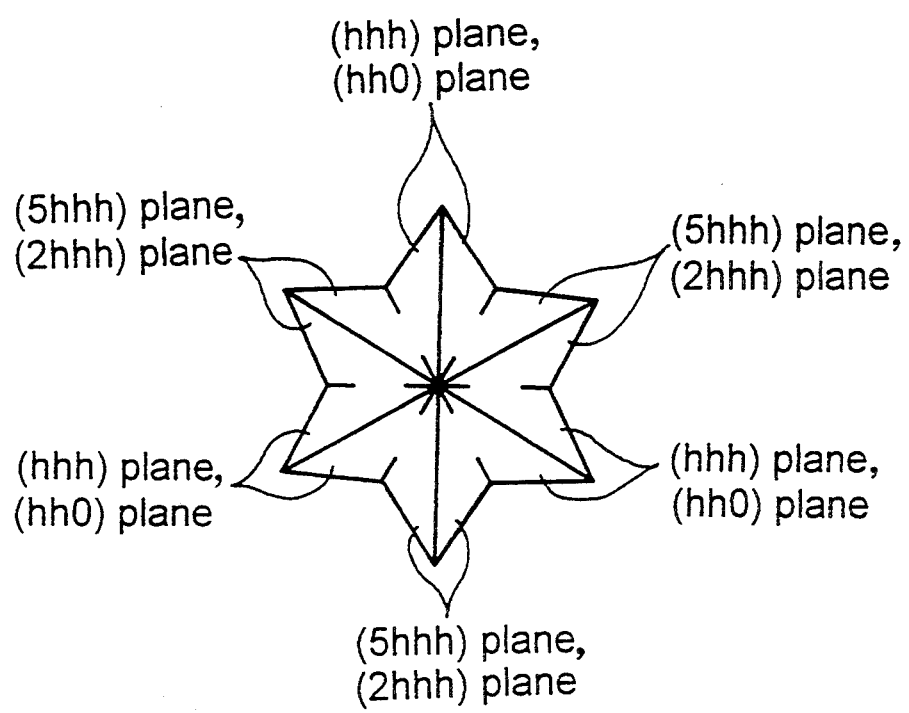
FIG. 29 is a plan view illustrating crystal planes located on slants in one example of a hexagonal pyramid-shaped tip end portion.
Figure 30:
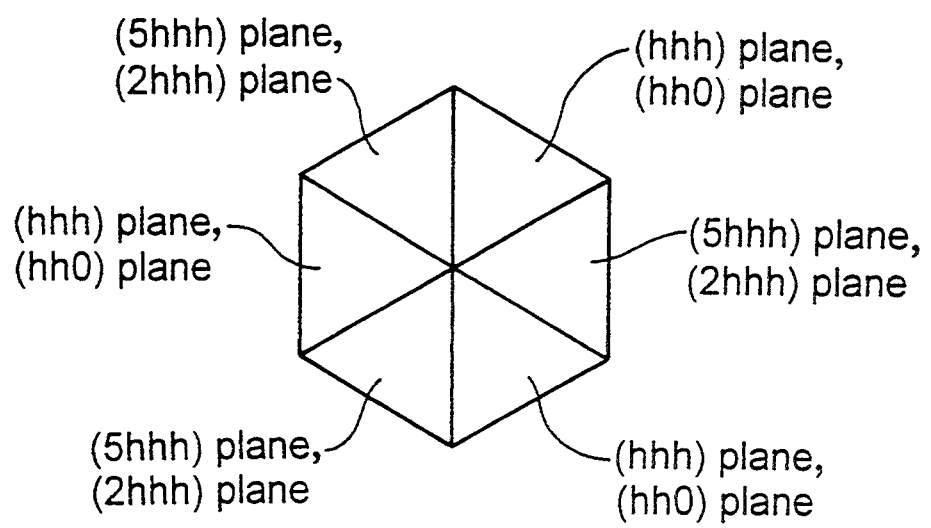
FIG. 30 is a plan view illustrating crystal planes located on slants in another example of a hexagonal pyramid-shaped tip end portion.
Figure 31:
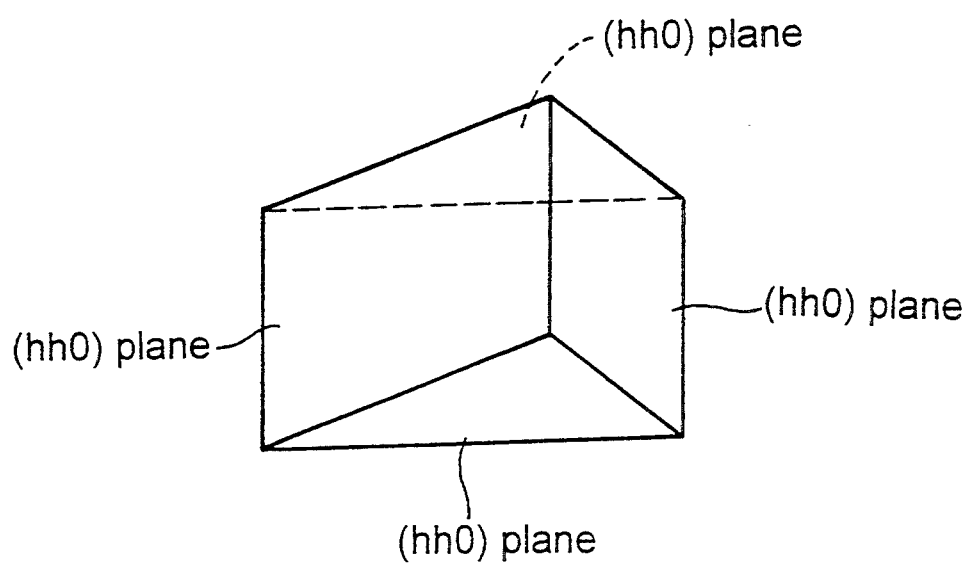
FIG. 31 is a perspective view illustrating crystal planes located on slants and end faces of a small pyramid-shaped tip end portion.
Figure 32:
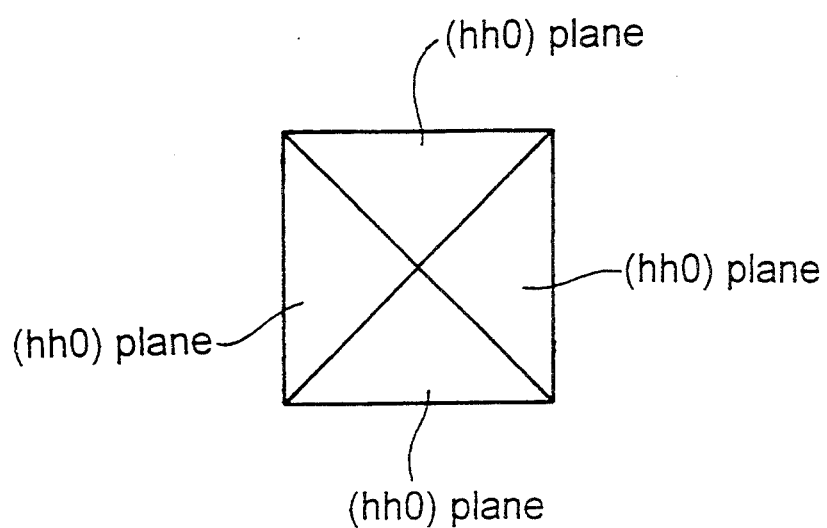
FIG. 32 is a plan view illustrating crystal planes located on slants of a quadrangular pyramid-shaped tip end portion.

| Oriented metal crystal | Crystalline shape of slide surface | Crystal plane located in each slant | Characteristic of slant | Referential drawing |
| --- | --- | --- | --- | --- |
| (hhh) | Trigonal pyramid | (hh0) plane: packed-plane | high hardness, good wettability and good wear resistance | FIG. 28 |
| | Hexagonal pyramid | (hhh) plane: 50% (5hhh) plane: 50% | excellent wettability because of (hhh) plane having a large surface energy | FIG. 29; concave slant |
| | | (hh0) plane: 50% (2hhh) plane: 50% (hh0) plane: packed-plane | high hardness, good wettability and good wear resistance | FIG. 30: flat slant |
| (2hhh) | Small pyramid | (hh0) plane: packed-plane | high hardness, good wettability and good wear resistance | FIG. 31 |
| (h00) | quadrangular pyramid | (hh0) plane: packed-plane | high hardness, good wettability and good wear resistance | FIG. 32 |

It should be noted that for the wettability of the crystal planes located on the slants to oil or the like, the (hhh) plane is superior to the (hh0) plane.

The slide surface construction is applicable, for example, to slide portion of any of the following pans for internal combustion engines: pistons (ring grooves), piston rings, piston pins, connecting rods, crankshafts, bearing metals, oil pump rotors, oil pump rotor housings, cam shafts, springs (end faces), spring seats, spring retainers, cotters, rocker arms, roller bearing outer cases, roller bearing inner cases, valve stems, valve faces, hydraulic tappets, water pump rotor shafts, pulleys, gears, transmission shaft portions, clutch plates, washers, and bolts (bearing surfaces and threaded portions).

What is claimed is

1. A slide surface construction, which is formed of an aggregate of metal crystals having a body-centered cubic structure, said aggregate including (hhh) oriented metal crystals with their (hhh) planes by Miller indices oriented toward the slide surface, the content S of said (hhh) oriented metal crystals being in a range represented by $S \geq 20\%$.

2. A slide surface construction according to claim 1, wherein the content S of said (hhh) oriented metal crystals is in a range represented by $S \geq 40\%$.

3. A slide surface construction according to claim 1 or 2, wherein said metal crystals are Fe crystals, said (hhh) planes are {222} planes, and the {222} oriented Fe crystals on the slide surface are of a pyramid shape.

4. A slide surface construction according to claim 3, wherein the content S of at least one of {200} oriented Fe crystals with their {200} planes by Miller indices oriented toward the slide surface and {310} oriented Fe crystals with their {310} planes by Miller indices oriented toward the slide surface is equal to 0%.

5. A slide surface construction according to claim 1 or 2, wherein the inclination angle Θ formed by the (hhh) planes with respect to a plane parallel to the slide surface is set in a range of $0° \leq \Theta \leq 15°$.

6. A slide surface construction, which is formed of an aggregate of metal crystals having a body-centered cubic structure, said aggregate including (hhh) oriented metal crystals with their (hhh) planes by Miller indices oriented toward a slide surface, and (2hhh) oriented metal crystals with their (2hhh) planes by Miller indices oriented toward the slide surface, and wherein the content S of said (hhh) oriented metal crystals is in a range represented by $S \geq 20\%$, and the content S of said (2hhh) oriented metal crystals is in a range represented by $20\% \leq S \leq 60\%$.

7. A slide surface construction according to claim 6, wherein said metal crystals are Fe crystals, said (hhh) planes are {222} planes and the {222} oriented Fe crystals on the slide surface are of a pyramid shape, and said (2hhh) planes are {211} planes and the {211} oriented Fe crystals on the slide surface are of a small pyramid shape.

8. A slide surface construction according to claim 6 or 7, wherein the inclination angle Θ formed by the (hhh) planes with respect to a plane parallel to the slide surface is set in a range of $0° \leq \Theta \leq 15°$.

9. A slide surface construction, which is formed of an aggregate of metal crystals having a body-centered cubic structure, said aggregate including (hhh) oriented metal crystals with their (hhh) planes by miller indices oriented toward the slide surface, and (hh0) oriented metal crystals with their (hh0) planes by Miller indices oriented toward the slide surface and wherein the content S of said (hhh) oriented metal crystals and the content S of the (hh0) oriented metal crystals are in a range represented by $S \geq 20\%$, respectively.

10. A slide surface construction according to claim 9, wherein said metal crystals are Fe crystals, said (hhh) planes are {222} planes and the {222} oriented Fe crystals on the slide surface are of a pyramid shape, and said (hh0) planes are {110} planes and the {110} oriented Fe crystals on the slide surface are of a plate-like shape.

11. A slide surface construction according to claim 9 or 10, wherein the inclination angle Θ formed by the (hhh) planes with respect to a plane parallel to the slide surface is set in a range of $0° \leq \Theta \leq 15°$.

* * * * *